(12) United States Patent
Das et al.

(10) Patent No.: US 12,632,816 B2
(45) Date of Patent: May 19, 2026

(54) SYSTEMS AND METHODS FOR MEASURING AND REPORTING COLLABORATION PARAMETERS

(71) Applicant: Box, Inc., Redwood City, CA (US)

(72) Inventors: Sanjiv Ranjan Das, San Jose, CA (US); Ivan Galea, San Carlos, CA (US); Mark Scarr, Scotts Valley, CA (US); Anand Subramanian, Menlo Park, CA (US); Hariharan Swaminathan, Mountain View, CA (US)

(73) Assignee: Box, Inc., Redwood City, CA (US)

( * ) Notice: Subject to any disclaimer, the term of this patent is extended or adjusted under 35 U.S.C. 154(b) by 553 days.

(21) Appl. No.: 16/777,801

(22) Filed: Jan. 30, 2020

(65) Prior Publication Data

US 2020/0242527 A1     Jul. 30, 2020

Related U.S. Application Data

(60) Provisional application No. 62/799,019, filed on Jan. 30, 2019.

(51) Int. Cl.
| | |
|---|---|
| *G06Q 30/02* | (2023.01) |
| *G06F 16/901* | (2019.01) |

(Continued)

(52) U.S. Cl.
CPC ..... *G06Q 10/0639* (2013.01); *G06F 16/9024* (2019.01); *G06N 5/047* (2013.01); *G06Q 10/10* (2013.01); *H04L 65/403* (2013.01)

(58) Field of Classification Search
CPC .................................................. G06Q 30/02

(Continued)

(56) References Cited

U.S. PATENT DOCUMENTS

| | | | | |
|---|---|---|---|---|
| 2017/0358036 A1* | 12/2017 | Kimball | .................. | G06F 16/48 |
| 2020/0007934 A1* | 1/2020 | Ortiz | ................... | G06N 3/0442 |

OTHER PUBLICATIONS

"Wikipedia Entry: Confusion Matrix", dated Nov. 27, 2018, URL: https://en.wikipedia.org/wiki/Confusion_matrix.

(Continued)

*Primary Examiner* — Afaf Osman Bilal Ahmed
(74) *Attorney, Agent, or Firm* — Vista IP Law Group, LLP

(57) ABSTRACT

Methods, systems and computer program products for recommending remediation actions to selected users of collaboration systems. Certain disclosed techniques commence upon observing user-to-object interactions and user-to-user interactions raised by users of a collaboration system. A first specialized data structure is populated with activity values that characterize user-to-object interactions raised by individual users. A second specialized data structure is populated with sharing values that characterize observed sharing events over shared content objects. The values of the first data structure are correlated to the values of the second data structure to calculate a total contribution amount for each of the users of the collaboration system. A small set of communication recipients is identified by ranking the individual users based on a calculated total contribution amount. To avoid wasteful messaging to all users of the collaboration system, messages are sent only to the small set of recipients. The messages contain recommended remediation actions.

20 Claims, 23 Drawing Sheets

(51) Int. Cl.
　　*G06N 5/047* 　　　(2023.01)
　　*G06Q 10/0639* 　　(2023.01)
　　*G06Q 10/10* 　　　(2023.01)
　　*H04L 65/403* 　　　(2022.01)
(58) Field of Classification Search
　　USPC ........................................................ 705/14.1
　　See application file for complete search history.

(56) References Cited

OTHER PUBLICATIONS

D. Acemoglu, V. M. Carvalho, A. Ozdaglar, and A. Tahbazâ€ Salehi. The Network Origins of Aggregate Fluctuations. Econometrica, 80(5): 1977-2016, Sep. 2012.
V. D. Blondel, J.-L. Guillaume, R. Lambiotte, and E. Lefebvre. Fast unfolding of communities in large networks. Journal of Statistical Mechanics: Theory and Experiment, 2008(10):p. 10008, Oct. 2008.
P. Bonacich. Power and Centrality: A Family of Measures. American Journal of Sociology, 92(5):1170-1182, Mar. 1987.
T. J. Chemmanur, E. Loutskina, and X. Tian. Corporate Venture Capital, Value Creation, and Innovation. Review of Financial Studies, 27(8):2434-2473, Aug. 2014.
R. L. Cross, R. D. Martin, and L. M. Weiss. Mapping the value of employee collaboration | Mckinsey. Mckinsey Quarterly, Aug. 2006.

L. C. Freeman. A Set of Measures of Centrality Based on Betweenness. Sociometry, 40(1):35-41, 1977.
B. B. Frey, J. H. Lohmeier, S. W. Lee, and N. Tollefson. Measuring Collaboration Among Grant Partners. American Journal of Evaluation, 27(3):383-392, Sep. 2006.
R. Gajda. Utilizing Collaboration Theory to Evaluate Strategic Alliances. American Journal of Evaluation, 25(1):65-77, Mar. 2004.
E. Hess and J. Liedtka. The Physics of Business Growth: Mindsets, System, and Processes. Stanford University Press, Stanford, 2012.
W. W. Leontief. Input-Output Economics. Oxford University Press, Oxford, New York, second edition, Mar. 1986.
J. Long, B. and C. Plosser. Real Business Cycles. Journal of Political Economy, 91(1):39-69, 1983.
K. Olmstead, C. Lampe, and N. B. Ellison. Social Media and the Workplace, Jun. 2016.
Kinni, T., "Does Social Media Enhance Employee Productivity?," MIT Sloan, dated Jul. 7, 2016, URL: https://sloanreview.mit.edu/article/does-social-media-enhance-employee-productivity/.
"Tools for Measuring Collaboration," Broadleaf Consulting, date found via Google as Dec. 8, 2015.
"Euler's Homogeneous Function Theorem," Wolfram Mathworld, last updated Jan. 18, 2019.
"Wikipedia Entry: Herfindahl-Hirschman index," Wikipedia, last updated on Apr. 4, 2018, URL: https://en.wikipedia.org/wiki/Herfindahl_index.

\* cited by examiner

1D00

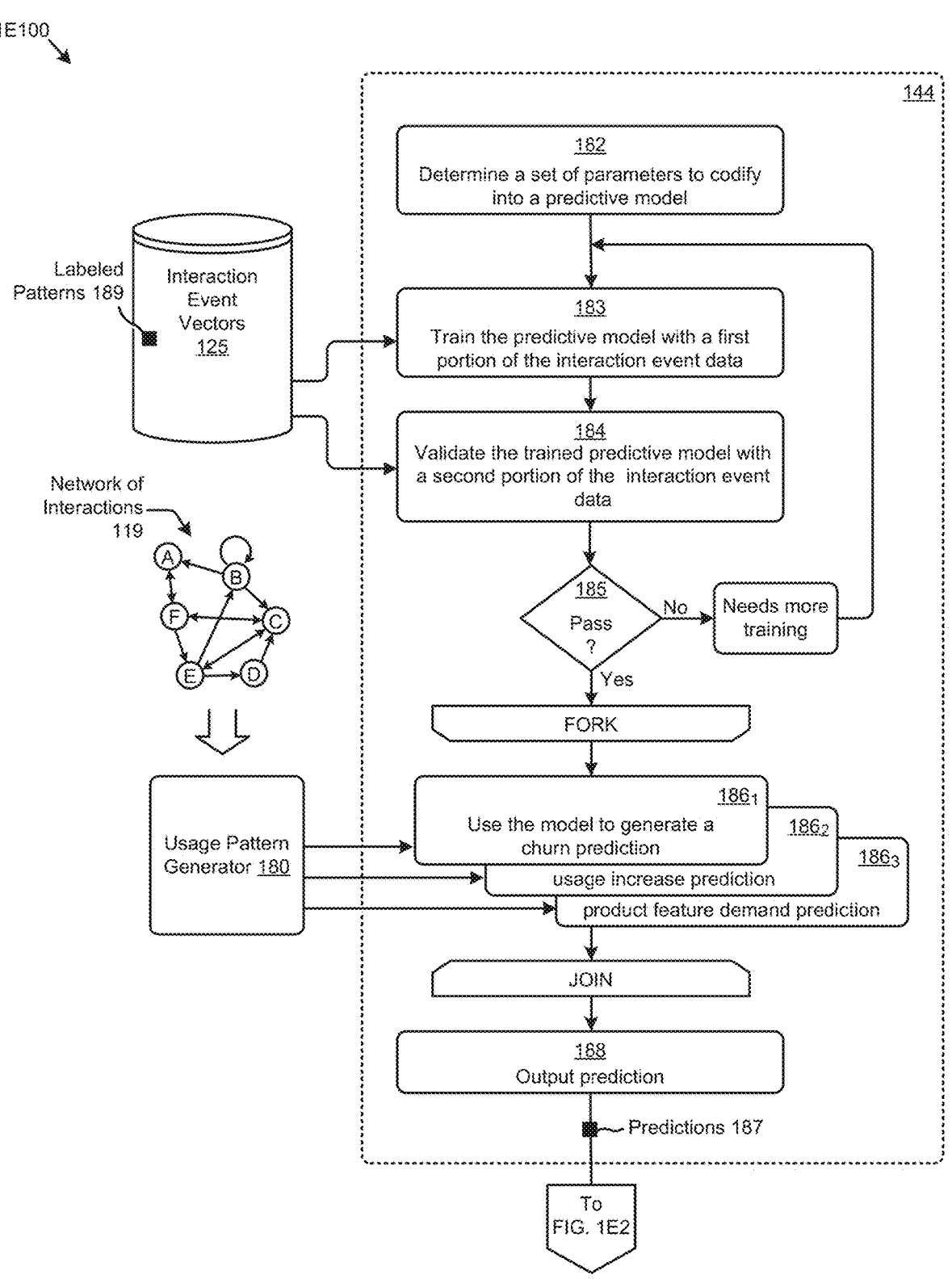

1E100

144

182
Determine a set of parameters to codify into a predictive model

Labeled Patterns 189

Interaction Event Vectors 125

183
Train the predictive model with a first portion of the interaction event data 184
Validate the trained predictive model with a second portion of the interaction event data Network of Interactions 119

A  B  F  C  E  D

185
Pass ?

No → Needs more training

Yes

FORK

Usage Pattern Generator 180

186₁
Use the model to generate a churn prediction

186₂
usage increase prediction

186₃
product feature demand prediction

JOIN

188
Output prediction

Predictions 187

1E200
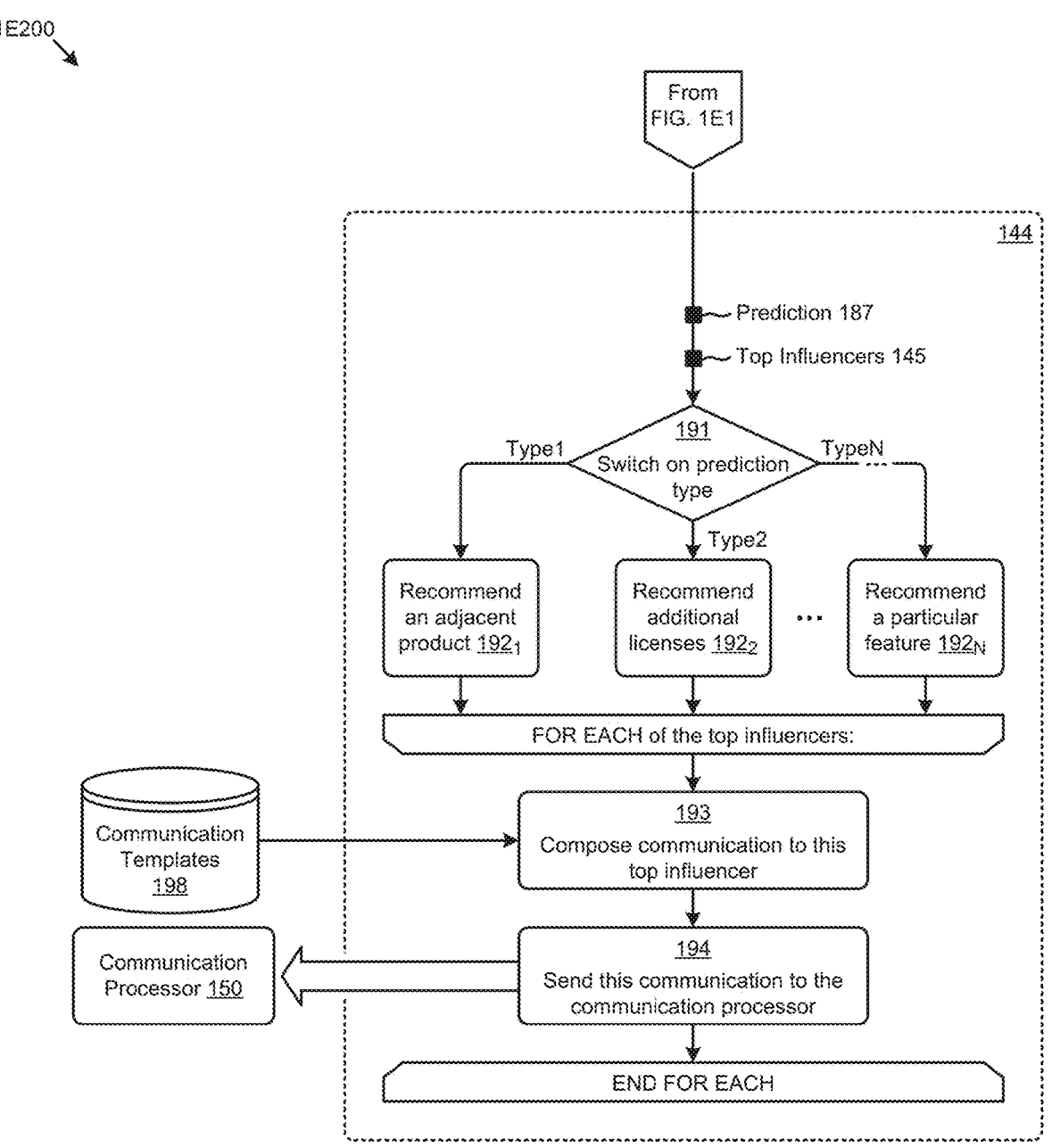
FIG. 1E2

Scenario 1: Person B, the receiver, previewed/downloaded the file. The transaction was completed and this is now a link.

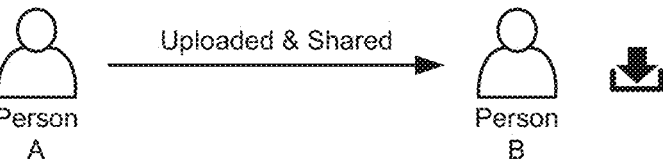

Scenario 2: Person D, the receiver, never previews or downloads the file. In this scenario, no link is formed and is thus excluded from the analysis.

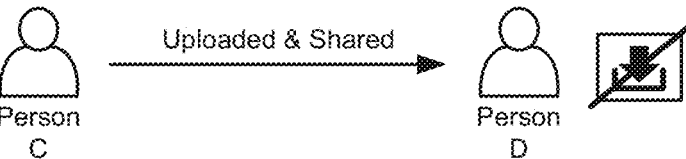

Links are determined by specific types of file or folder actions (e.g., upload, preview, open, download). There can be links between external and internal users.

FIG. 4

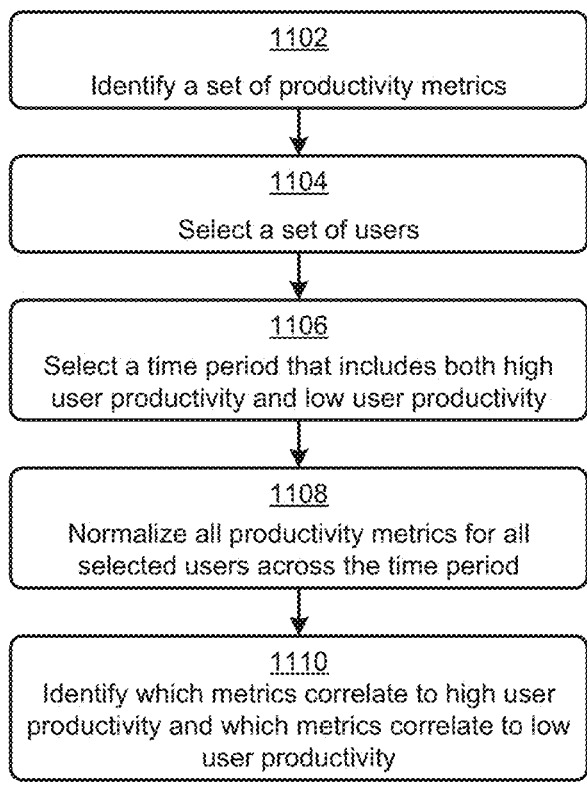

<u>1102</u>
Identify a set of productivity metrics

<u>1104</u>
Select a set of users

<u>1106</u>
Select a time period that includes both high user productivity and low user productivity <u>1108</u>
Normalize all productivity metrics for all selected users across the time period <u>1110</u>
Identify which metrics correlate to high user productivity and which metrics correlate to low user productivity

14A00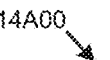

One or more computer processors to execute a set of program code instructions ~ 14A10

Program code for observing user-to-object interactions and user-to-user interactions raised by users of the collaboration system over a time period ~ 14A20

14A05

Program code for constructing a first data structure to track a first set of values that characterize user-to-object interactions raised by individual users of the collaboration system ~ 14A30

Program code for constructing a second data structure to track a second set of values that characterize observed events over content objects that are shared between a given user and other users of the collaboration system ~ 14A40

Program code for correlating, for the individual users of the collaboration system, the first set of values of the first data structure with the second set of values from the second data structure to characterize a total contribution amount for the individual users of the collaboration system ~ 14A50

Program code for identifying a set of communication recipients by ranking the individual users based on the total contribution amount ~ 14A60

Program code for sending a communication to the identified set of communication recipients. ~ 14A70

FIG. 14A

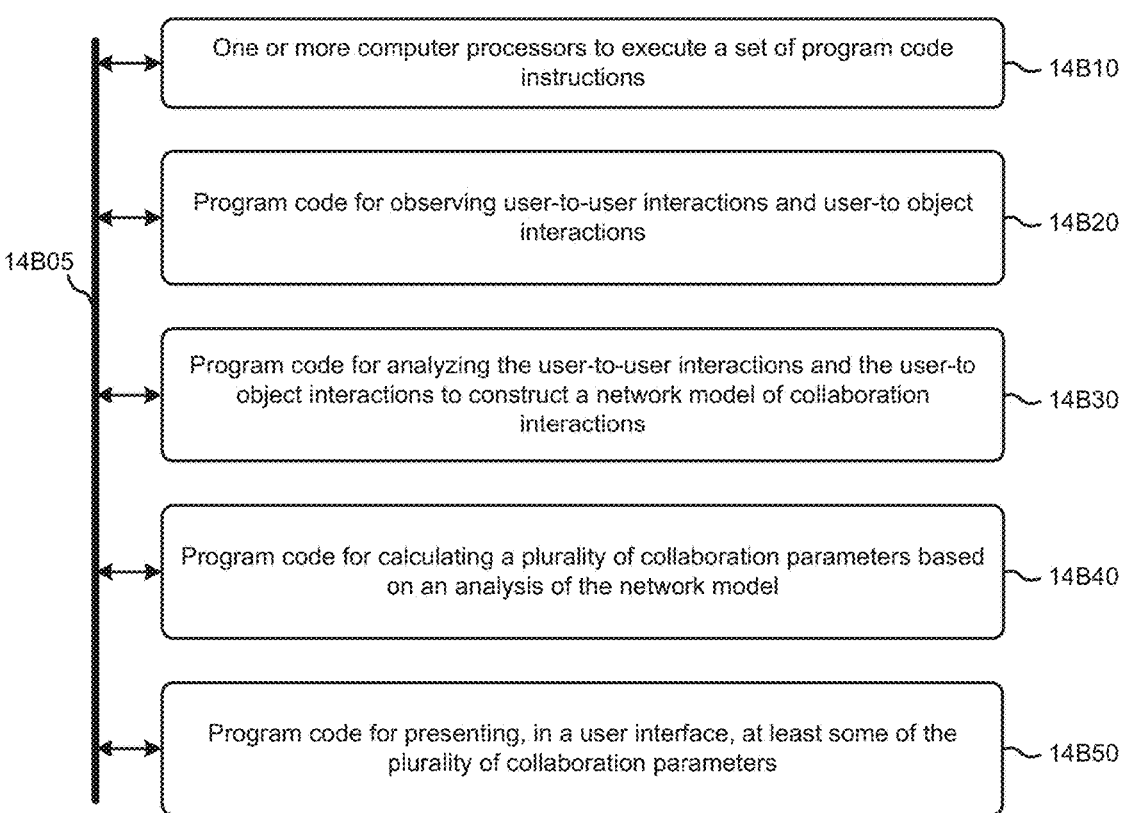

14B00

14B05

| | |
|---|---|
| One or more computer processors to execute a set of program code instructions | ⎯ 14B10 |
| Program code for observing user-to-user interactions and user-to object interactions | ⎯ 14B20 |
| Program code for analyzing the user-to-user interactions and the user-to object interactions to construct a network model of collaboration interactions | ⎯ 14B30 |
| Program code for calculating a plurality of collaboration parameters based on an analysis of the network model | ⎯ 14B40 |
| Program code for presenting, in a user interface, at least some of the plurality of collaboration parameters | ⎯ 14B50 |

FIG. 14B

SYSTEMS AND METHODS FOR MEASURING AND REPORTING COLLABORATION PARAMETERS

CROSS REFERENCE TO RELATED APPLICATIONS

The present application claims the benefit of priority to U.S. Provisional Patent Application Ser. No. 62/799,019 titled "SYSTEMS AND METHODS FOR MEASURING AND REPORTING COLLABORATION PARAMETERS", filed on Jan. 30, 2019, which is hereby incorporated by reference in its entirety.

FIELD

This disclosure relates to collaboration systems, and more particularly to techniques for systems and methods for measuring and reporting collaboration parameters.

BACKGROUND

Computerized collaboration systems have evolved and been adopted to the point where most large companies license one or more collaboration tools that are made available to virtually all employees of a company. As the day-to-day activities of the company are carried out, users (e.g., employees) collaborate with other users (e.g., other employees, bosses, customer contacts, supplier contacts, etc.). As a consequence of how these modern collaborations systems make content objects (e.g., files, folders, databases, etc.) available for sharing, the collaboration system is able to track user-to-user activities and user-to file activities.

This tracking is useful for identifying content objects that are "trending" (i.e., to be presented in a "feed") as well as for identifying content objects that have gone into disuse (i.e., to be considered for offloading or deleting). Such tracking can also be used to identify and rank usage patterns, and in turn the ranked usage patterns can be used to help users to derive more benefits from usage of their collabo- ration system. For example, if a pattern emerges that users of the collaboration system are not using a particular feature, and it can be known that usage of that particular feature would inure productivity benefits, then the collaboration system itself might bring this to the attention of the users. As another example, a 'clumsy' usage pattern might emerge that could be addressed by a feature upgrade, after which upgrade productivity would be expected to improve. As yet another example, it might emerge that only certain groups of users within the organization are actively using the collabo- ration features. In any of the foregoing examples, a com- munication might go out to the users of the collaboration system to suggest (1) adoption of an existing productivity feature, or (2) to suggest an upgrade of the collaboration system licenses to enable additional productivity features, or (3) to suggest that the inactive users "do something" more effectively avail of the productivity features of the collabo- ration system.

Unfortunately, broadcasting these communications out to all users of the collaboration system has proven to be ineffective, at least inasmuch as all users might not be in a position to take action (e.g., buy more licenses, etc.) of their own accord. Moreover, broadcasting these communications out to all users of the collaboration system is extremely wasteful of computing resources since in practice only certain of the users (e.g., influencers) will take the initiative on the basis of the communication. Therefore, what is needed is a way to reduce computer resource demands when sending communications out to users of the collaboration system. What is needed is a way to identify a subset of users who meet a certain set of criteria (e.g., high-productivity influencers), and then to narrowcast targeted communica- tions that are sent only to that subset of users, thereby avoiding the wastefulness of broadcasting communications to all users of the collaboration system.

SUMMARY

The present disclosure describes techniques used in sys- tems, methods, and in computer program products for sys- tems and methods for formulating a selected set of commu- nications that are sent only to a determined set of influencers. Certain embodiments are directed to technologi- cal solutions for collecting corpora of collaboration events and transforming them into numeric parameter values for analysis.

The disclosed embodiments modify and improve over legacy approaches. In particular, the herein-disclosed tech- niques provide technical solutions that address the technical problem of quantitatively key influencers so as to avoid wasteful broadcasting of productivity messages to recipients other than the key influencers. Such technical solutions involve specific implementations (i.e., data organization, data communication paths, module-to-module interrelation- ships, etc.) that relate to the software arts.

Further details of aspects, objectives, and advantages of the technological embodiments are described herein, and in the drawings and claims.

BRIEF DESCRIPTION OF THE DRAWINGS

FIG. 1E1 and FIG. 1E2 present techniques for forming communications that are directed to only influencers, according to an embodiment.

FIG. 2 is a graph showing a logistic function that is used in collaborative productivity models for measuring and reporting a user's individual productivity, according to an embodiment.

FIG. 4 depicts representative scenarios for determining strength of user interactions that are used in measuring and reporting collaboration parameters, according to an embodi- ment.

FIG. 11 presents a technique for determining negative and positive correlations across a set of productivity metrics, according to an embodiment.

FIG. 14A depicts system components as arrangements of computing modules that are interconnected so as to implement certain of the herein-disclosed embodiments.

FIG. 14B depicts system components as arrangements of computing modules that are interconnected so as to implement certain of the herein-disclosed embodiments.

DETAILED DESCRIPTION

Figure 1A:
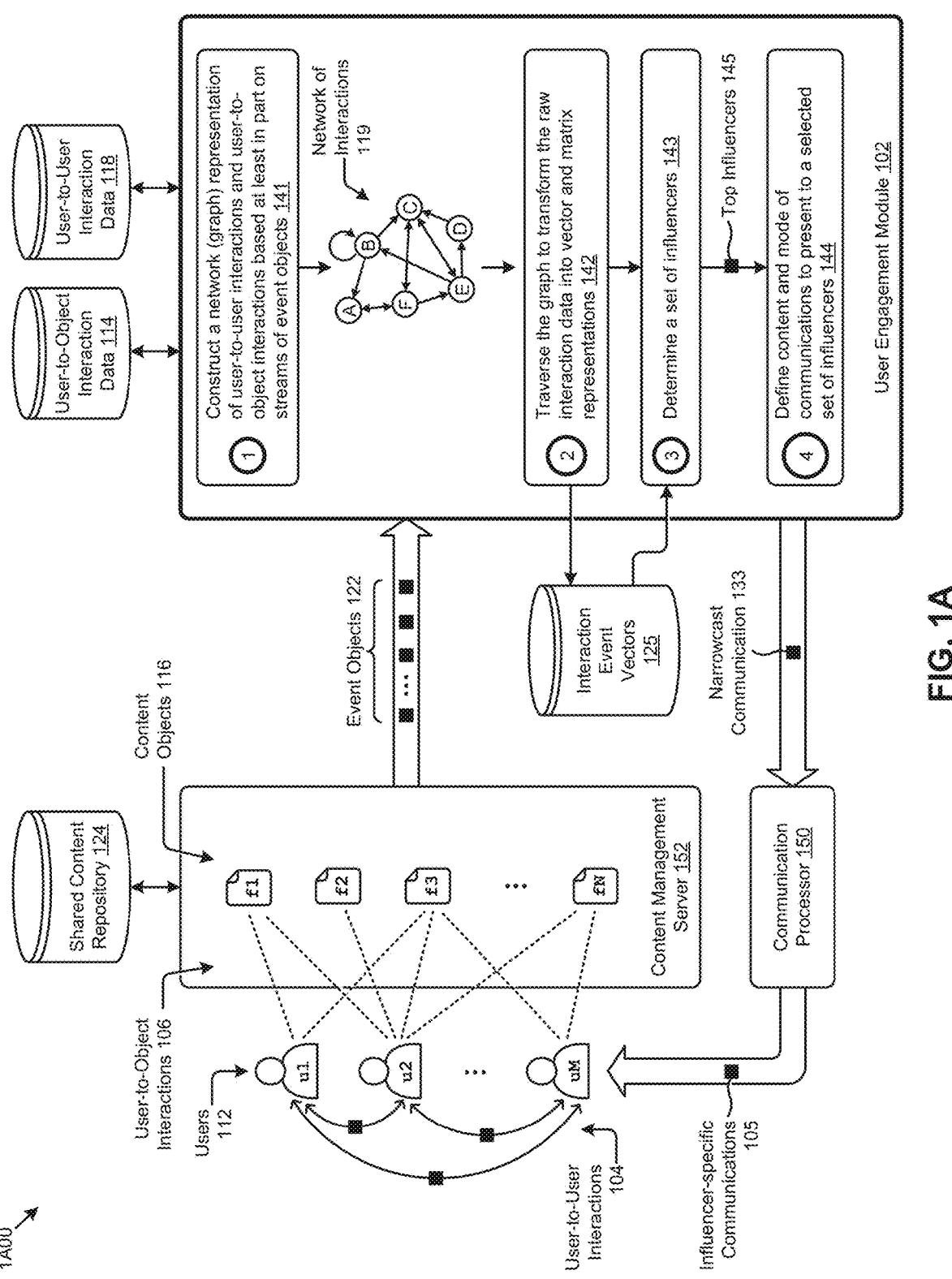
FIG. 1A depicts several interconnected systems forming an enterprise-level collaboration environment that is suited for measuring and reporting collaboration parameters, according to an embodiment.

Aspects of the present disclosure solve problems associated with using computer systems to collect and analyze data so as to empirically gauge how collaborators are working together. These problems are unique to, and may have been created by, computer-implemented data collection methods that have been used in collaboration systems. Some embodiments are directed to approaches for collecting a corpus of collaboration events and transforming them into numeric parameter values. The accompanying figures and discussions herein present example environments, systems, methods, and computer program products for measuring and reporting collaboration parameters.

Overview

Measuring productivity in the workplace has been a focus of companies since the industrial revolution. Whereas it is easy to measure work that is based on measurable individual outcomes, as in (physical) factory production tasks or paper processing tasks such as (cognitive) paralegal work, etc., much of the output of today's workforce is dominantly based on teamwork and not dominantly based individual contributions. Many modern workplace tools are designed to make coordinated work easier and efficient, yet the ability to measure the effect of coordinated work versus individual work has been elusive. Accordingly, disclosed herein are quantitative measures and techniques that can be used to identify dominant contributors (i.e., key influencers). These key influencers can then be motivated to take specific recommended actions that would serve to enhance the productivity of the organization as a whole.

Collaboration System Metrics

Organizations have many systems that measure individual productivity and performance, however determining the productivity of a company as a whole presents challenges. Disclosed herein are techniques to formulate and use a productivity score based on a mathematical framework that employs collaboration system data. The techniques can be applied to generate:

1. a score for both individual and company productivity,
2. a decomposition of company productivity into that contributed by each employee,
3. a breakdown of company productivity into that which comes from individual versus collaborative effort, and
4. a quantitative indication of which users are key influencers.

There are many approaches for measuring collaboration, however identifying key influencers (which is not solely tied to mere activity) has been elusive to measure. The foregoing framework offers an objective way to do this.

While there is some evidence that social networks enhance workplace productivity (and also hamper it), the disclosed techniques examine non-social workplace networks using file and folder sharing data. This enables capture of quantitative aspects of collaboration in a graph-theoretic manner. File-sharing networks embody complex, nested input-output structures that feed on each other in enhancing collaboration. Moreover, in modern collaboration systems, there may be hundreds of thousands of users and millions of files and folders. The disclosed techniques present methods for quantification of which users from among this pool of hundreds of thousands of users can be deemed as key influencers. These key influencers in turn become the intended audience for narrowly-distributed communications.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A depicts several interconnected systems forming an enterprise-level collaboration environment 1A00 that is suited for measuring and reporting collaboration parameters. As an option, one or more variations of enterprise-level collaboration environment 1A00 or any aspect thereof may be implemented in the context of the architecture and functionality of the embodiments described herein.

FIG. 1A illustrates aspects pertaining to collecting a corpus of collaboration events and transforming them into numeric parameter values. More specifically, FIG. 1A depicts user-to-user interactions 104 that occur over time when two or more users 112 interact with a content management server 152. Some of the shown interactions are specific to actions taken on content objects 116 (e.g., files or folders) that are stored in a shared content repository 124.

When two or more users 112 interact (e.g., via user-to-object interactions 106), event objects 122 are generated. Ongoing streams of event objects are received into a user engagement module 102. Contemporaneously, contents of the streams of event objects are analyzed, and at least some of the event objects cause storage of user-to-object interaction data 114. Also, at least some of the event objects cause storage of user-to-user interaction data 118. At operation 1 (shown as step 141), such user-to-object interaction data and user-to-user interaction data can be used to generate a network model (e.g., the shown network of interactions) to represent the collaboration interactions.

At operation 2 (shown in step 142), the network model is traversed to transform and/or extract the specific interactions into a set of interaction event vectors 125. The aforementioned specific interactions are computer readable values that are used to quantify productivities of users and/or their organizations. As used herein, productivity is quantified using a function or multiple functions pertaining to (1) data production and (2) collaborative sharing. Additionally, patterns of interactions can be used to measure productivity. These patterns of interactions are identified by iterative traversals through the network of interactions. Still further, certain characteristics of the network on interactions correlate to the spread of productive information and some network structures indicate greater flow than others. Values that quantify flow can be used as an additional parameter.

Once the desired set of interaction event parameters have been extracted from the network of interactions, at operation 3 (step 143), the extracted interaction event vectors are analyzed to identify influencers. It is just these influencers, rather than the entire set of users given in the network of interactions who are targeted to receive the communications.

As such, operation 4 (shown as step 144) carries out an algorithm that defines the content and mode of communications to present to the influencers. The specific content and communication mode are codified into a narrowcast communication 133, which are received by the shown communication processor 150. The communication processor 150 in turn issues influencer-specific communications 105 to only the influencers, thereby avoiding the wastefulness of broadcasting communications to all users of the collaboration system. In an additional or alternative embodiment, the communication processor 150 might receive instructions to send communications to only a set of low-contributing users, thereby avoiding the wastefulness of broadcasting communications to all users of the collaboration system.

Figure 1B:
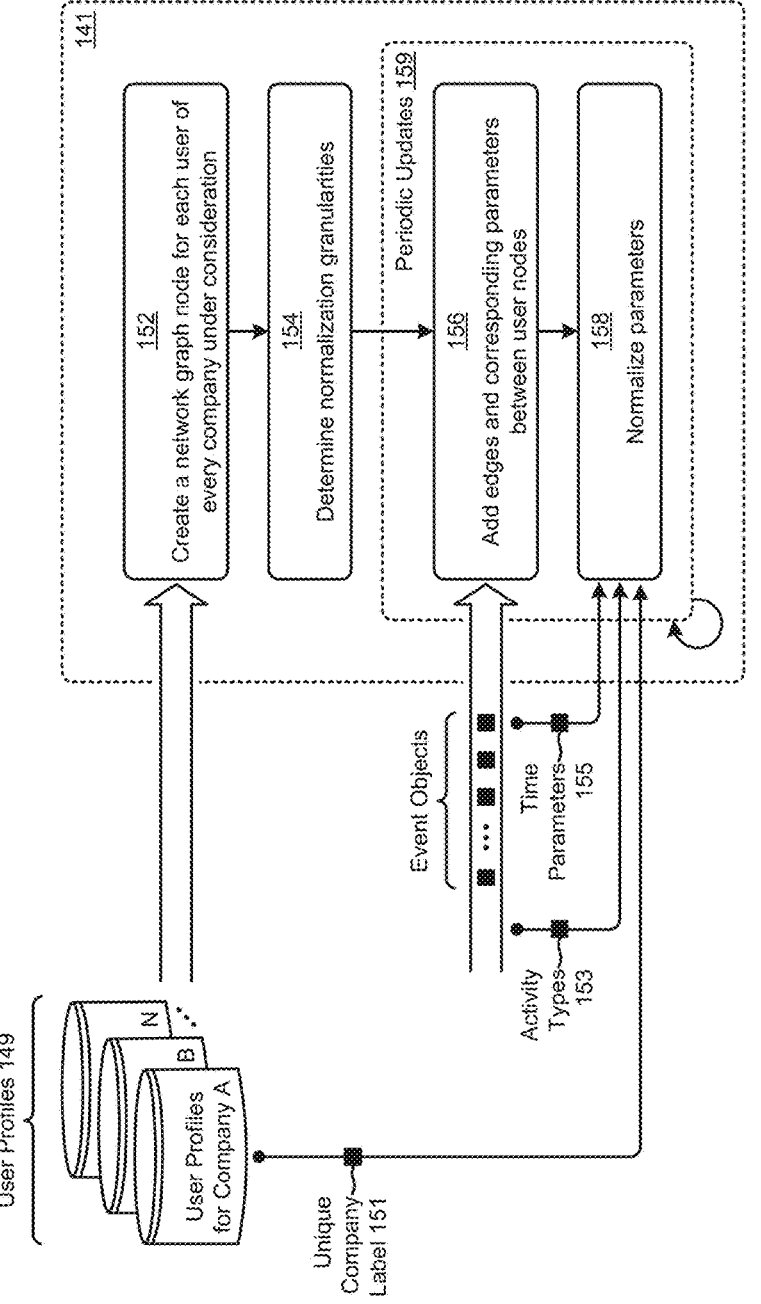
FIG. 1B depicts a network graph construction technique, according to an embodiment.

FIG. 1B depicts a network graph construction technique 1B00. A user can be associated with a particular enterprise or company, which affiliation might be captured in user profiles 149. These user profiles might be divided (as shown) in to multiple storage areas, or the user profiles might be stored in a single area such as in a database. As such, for each company on the file sharing platform, the interactions among users for a given company are used to construct the network model (step 152). For each time division (e.g., week) within a time period (e.g., many weeks) the user-to-object interaction data 114 and the user-to-user interaction data 118 is used to create normalized metrics (step 154) to codify into the network of interactions. Alternatively, other granularities can be chosen, such as daily or monthly data.

Next, add edges (step 156). The constructed networks are directed, weighted, possibly cyclic, or possibly acyclic graphs. The network may be thought of as a weighted "edge list", i.e., links between sender and receiver, where a pair (i, j) will have value greater than zero if i shared files with j, else the value would be 0. As the disclosed techniques make clear, these directed, weighted, cyclic or acyclic graphs can be developed from the user-to-object interaction data 114 and the user-to-user interaction data 118. The graph can be annotated with various parameter values, such as:

1. frequency of interaction,
2. sharing events, and/or the number of files shared in the sharing event interaction,
3. the size (bytes) in the interaction, and
4. an indicator variable if a sender and receiver interacted in a given period (usually a day).

This graph is normalized (step 158) so that all edge weights are in the range of (0, 1). The values to be normalized comprise, but are not limited to, activity types 153 and/or time parameters 155, and/or other values that can be applied to the edges. In some cases, a particular company (e.g., a company identified by the unique company label 151) can be selected to represent baselines for all normalized parameters. In some cases, a phantom company is defined so as to provide a baseline parameter unit value for any normalized parameter. The graph can be updated periodically (at block 159) to account for additional events, and/or additional users, etc.

The metrics below produce a composite measure for the collaboration system. The directed network graph G for a given company c at time (week) t can be defined as:

$$G(c,t) = \{V(c,t), E(c,t)\} \tag{EQ. 1}$$

where:

V(c, t) is the set of vertices for company c at time t, and

E(c, t) the set of ordered pairs of vertices, i.e., edges.

Figure 1C:
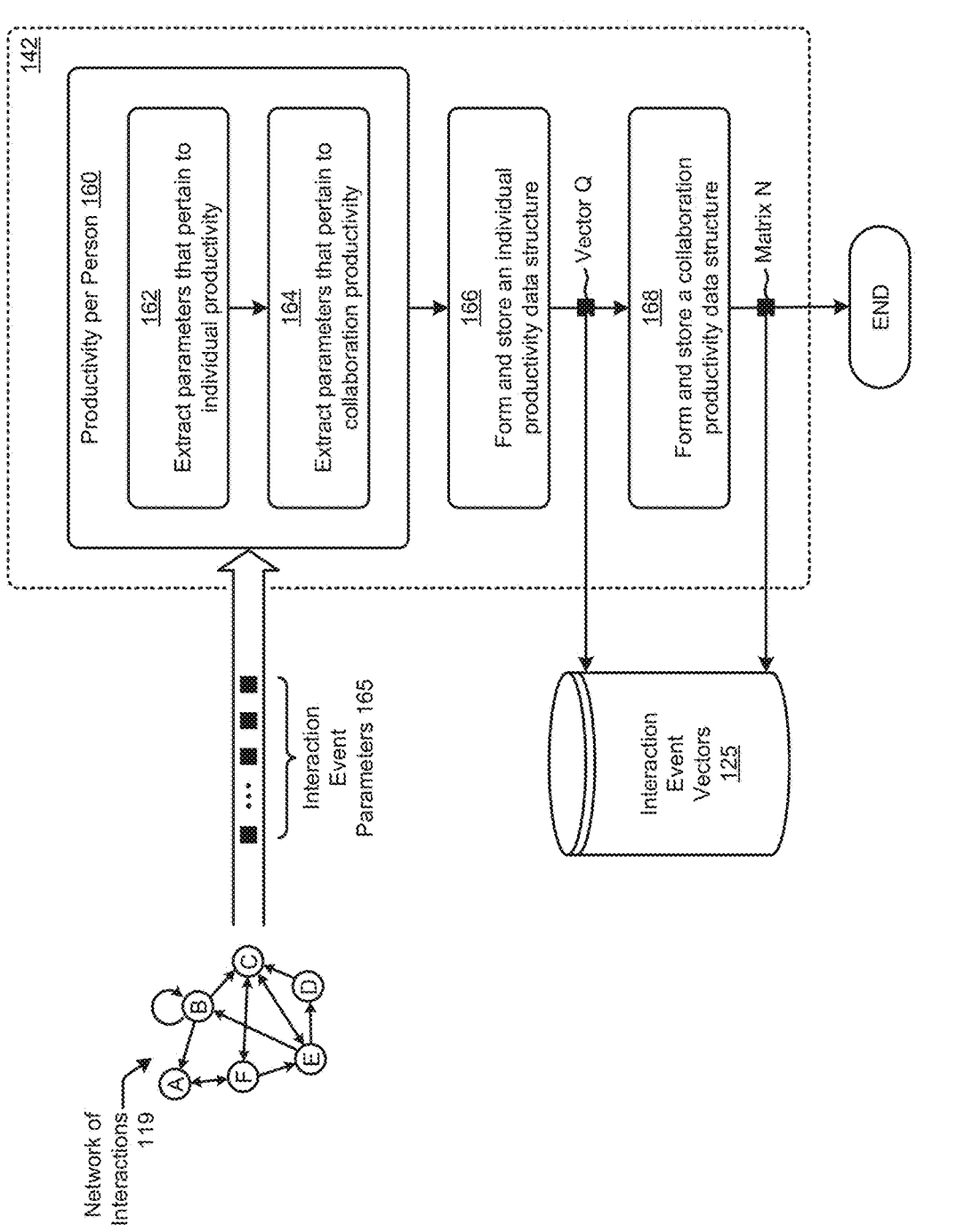
FIG. 1C depicts a productivity measure calculation tech- nique, according to an embodiment.

FIG. 1C depicts a productivity measure calculation technique. The measured productivity can correspond to an individual, or to a company or to a collaboration group, etc. The network graph codifies interaction event parameters 165 that incorporate values to characterize the quality, quantity, and transmission of information through the network. In accordance with the embodiments, a single number P describes the average productivity per person of a company. The number P is derived from content object sharing data. This number P is based on a flexible metric of file and or folder production undertaken by each person in the company.

In this example embodiment, total productivity contribution per person of a company is calculated in block 160. At step 162 individual productivity is calculated by extracting parameters that pertain to individual contributions of a given user. At step 164, collaboration productivity is calculated by extracting parameters that pertain to collaboration contributions between the users.

The foregoing extracted parameters are used to form an individual productivity data structure (at step 166) and a collaboration productivity data structure (at step 168). In the shown embodiment, the individual productivity data structure of step 166 serves to track individual contributions based on the number and type of interactions raised by individual users of the collaboration system. In the shown embodiment, the data structure of step 166 is formed into a vector (e.g., vector Q), however the foregoing individual productivity data structure of step 166 might be embodied as a table of values or a list of values or an array, or a hashset, or any known in the art computer-implemented structure that can be populated with values to represent a plurality of numeric and/or qualitative values (e.g., numeric values and/or qualitative values that correspond to a number and type of content object interactions raised by individual users of the collaboration system).

Continuing discussion of this particular embodiment, the collaboration productivity data structure of step 168 serves to track collaboration contributions based on shared content object interactions (e.g., sharing events) raised by the users of the collaboration system. In the shown embodiment, the data structure of step 168 is formed into a square collaboration network matrix (e.g., matrix N) however the foregoing collaboration productivity data structure of step 168 might be embodied as a table of values or a list of values or an array, or a hashset, or any known in the art computer-implemented structure that can be populated with values to represent a plurality of numeric and/or qualitative values (e.g., numeric values and/or qualitative values that correspond to a number and type of shared content object interactions raised by the users of the collaboration system).

Continuing this example embodiment, vector Q is populated based on file activity data for each person (e.g., employee) in the company. Additionally, linkages between a given user and all other users of the collaboration system are given by matrix N, which is also derived from the file activity data for each person. The dimension of vector Q is n, the number of people (nodes) in the network, i.e., $Q_i$, i=1, 2, . . . , n. Correspondingly, the dimension of matrix N will be n×n.

The next two sections describe the exact manner in which these two quantities, Q and N, are computed from the data. The term "file-sharing" or "file sharing" or "folder-sharing" or "folder sharing" is used interchangeably with the term "content object sharing". As used herein content objects are files or folders or respective metadata. The term "productivity" is used as a characterization of content object activity by a particular user.

First, the productivity per person is quantified (e.g., using extracted parameters from step 162):

$$P = \frac{1}{n} \cdot \sqrt{Q^T \cdot N \cdot Q} \qquad \text{(EQ. 2)}$$

$$= \sqrt{\frac{Q^T}{n} \cdot N \cdot \frac{Q}{n}}$$

$$= \sqrt{Q^{*T} \cdot N \cdot Q^*}$$

where:

$$Q^* = Q/n \in R^n$$

Next, Q and N are computed over time periods (e.g., weekly) for each company:

$$P(c, t) = \frac{1}{n} \cdot \sqrt{Q(c, t)^T \cdot N(c, t) \cdot Q(c, t)}, \ \forall \ c, t \qquad \text{(EQ. 3)}$$

where:
c indexes the company, and
t indexes time.
This equation implies that productivity, as denoted by scalar quantity P, increases if the elements of Q (individual productivity) increase, holding n and N constant. Likewise, ceteris paribus, if the elements of N (collaboration connectivity) increase, the metric also increases. This is intuitive, given that all values in Q and N are non-negative. The metric is normalized by dividing it by n, so that productivity is a per person measure (e.g., from parameters extracted in step 162).

The values in vector Q (from step 166) and matrix N (from step 168) are bounded in the range (0, 1). Hence, P is a positive real number in (0, 1). Because P≥0, cumulative P is a monotone increasing function over time.

In order to compare productivity over time, or across different entities, P is normalized to the same scale. This is done by normalizing Q using the mapping function described in the next section.

Quantifying Individual Productivity

Vector Q is computed to quantify individual productivity of every employee (i.e., a node i in the file-sharing graph), by generalizing the standard logistic function, i.e., $Q_i = f(q_i) = 1/(1+e^{-q_i})$, where $q_i$ is the number of files generated by node i. This is a well understood and documented function that maps an unbounded $q_i$ onto (0, 1), with $f(0)=0.5$. The generalized form is:

$$f(q_i) = a + m/(1 + ce^{-(q_i - q_0/k)}) \qquad \text{(EQ. 4)}$$

where:
a=y-intercept
m=curve's maximum value
k=steepness of the curve
c=asymmetry of the curve
$q_0$=value of the sigmoid's mid-point Setting a=0, m=1, k=1, c=1, and $q_0$=0 produces the standard logistic function as a special case. Since positive numbers only are used, and $f(0)$=0, setting a=-0.5, m=1.5, c=2, and $q_0$=0 defines the functional form used for any employee's entry in the Q vector as follows:

$$f(q_i) = -0.5 + 1.5/(1 + 2e^{-(qi/k)}) \tag{EQ. 5}$$

Figure 1D:
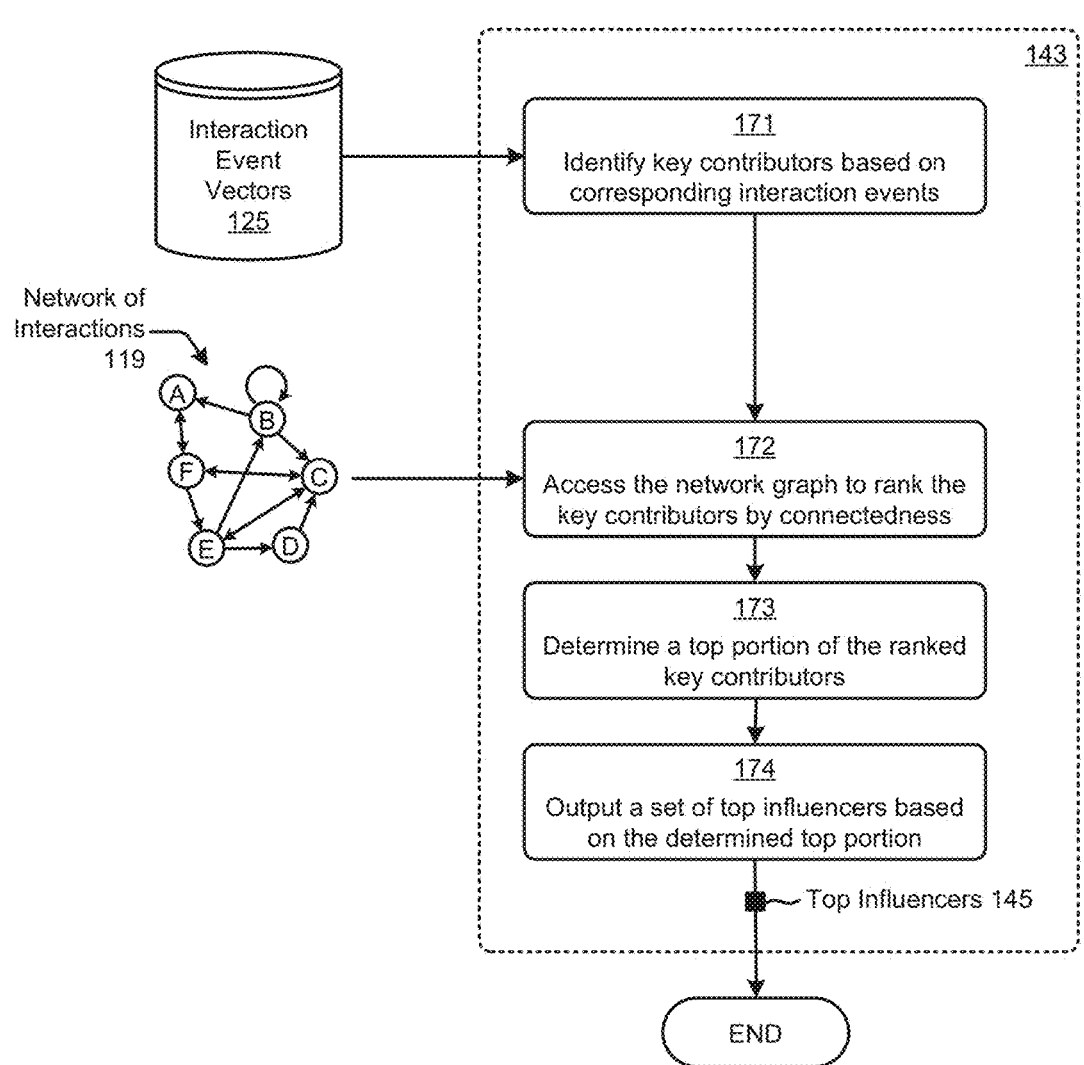
FIG. 1D presents a technique for analyzing productivity data to determine a set of influencers, according to an embodiment.

FIG. 1D presents a technique for analyzing productivity data to determine a set of influencers. The technique is presented as analysis flow 1D00, which flow commences at step 171 by accessing interaction event vectors 125. The interaction event vectors are analyzed to determine as set of users whose activities indicate that they are drivers of high productivity. Specifically, vector Q and matrix N are accessed for analysis. As described supra, matrix N contains linkages between persons in the company as derived from file-sharing activity. Accordingly, at least some of those users with high file sharing activity as given in matrix N are considered as potential influencers. Then, at step 172, those users with high file sharing activity are correlated with the network of interactions 119. The potential influencers can be ranked by connectedness. Alternatively, or additionally, potential influencers can be ranked by individual contribution values or by collaboration contribution values, whether considered individually or in combination.

A rank threshold is determined (step 173), and a set of top influencers (e.g., those potential influencers who have a rank below a threshold) are output (step 174) as top influencers 145. The determination of the rank threshold can be accomplished using any known technique. Strictly to illustrate one possible non-limiting technique, the rank threshold can be determined based on a percentage. For example, if the total number of users in matrix N is 10,000, then only the top 3% are considered influencers. Strictly to illustrate another possible non-limiting technique, the rank threshold can be determined based on a percentile.

The output of analysis flow 1D00 includes a set of top influencers 145, which is used in later processing.

FIG. 1E1 presents a technique for analyzing usage data to identify predictive patterns. More specifically, the prediction flow 1E100 commences at step 182 where a set of interaction event parameters are selected from the interaction event vectors 125 and used to codify as predictive variables in a predictive model. This predictive model is trained (step 183) using a first portion of the productivity data (step 184) and then validated using a second portion of the productivity data (step 184). One or more known-in-the-art quantitative metrics such as precision and recall are used to determine (at decision 185) whether or not the model is sufficiently trained so as to correctly predict likelihood of occurrence of a particular usage pattern (e.g., the shown labeled patterns 189) given a particular stimulus over a particular time period. In some cases, the model might need to be further trained, possibly by including more data, or possibly by including different or additional productivity parameters.

When the model is deemed to be sufficiently trained so as to correctly predict likelihood of a future occurrence of a particular usage pattern based on historical stimulus, then the model is stimulated with actual usage data. The shown usage pattern generator 180 serves to select input stimuli that corresponds to a determined time period. In the embodiment shown, the predictive model is able to generate a plurality of predictions. This can occur either in parallel (as shown) or iteratively. In the example shown, multiple applications of the model are performed in parallel in a FORK/JOIN block, so accordingly multiple outputs from the model are available after the JOIN. As shown, there are three example predictions made within prediction flow 1E100 (1) prediction of likelihood of an upcoming "dropout event" or an impending usage decrease, or a looming "churn" (at step $186_1$), (2) prediction of likelihood of an impending usage increase (at step $186_2$), and (3) prediction of a particular product feature demand (at step $186_3$). One or more predictions 187, possibly filtered against a threshold value is output (step 188). Other example predictions can be made within prediction flow 1E100. Strictly as additional examples, the model can be used to predict fluctuation and periodicity of increased/decreased usage. Additionally, or alternatively, the model can be used to predict an acceleration or deceleration of increased/decreased usage and/or prediction of usage being concentrated toward fewer and fewer users, etc.

Figure 2:
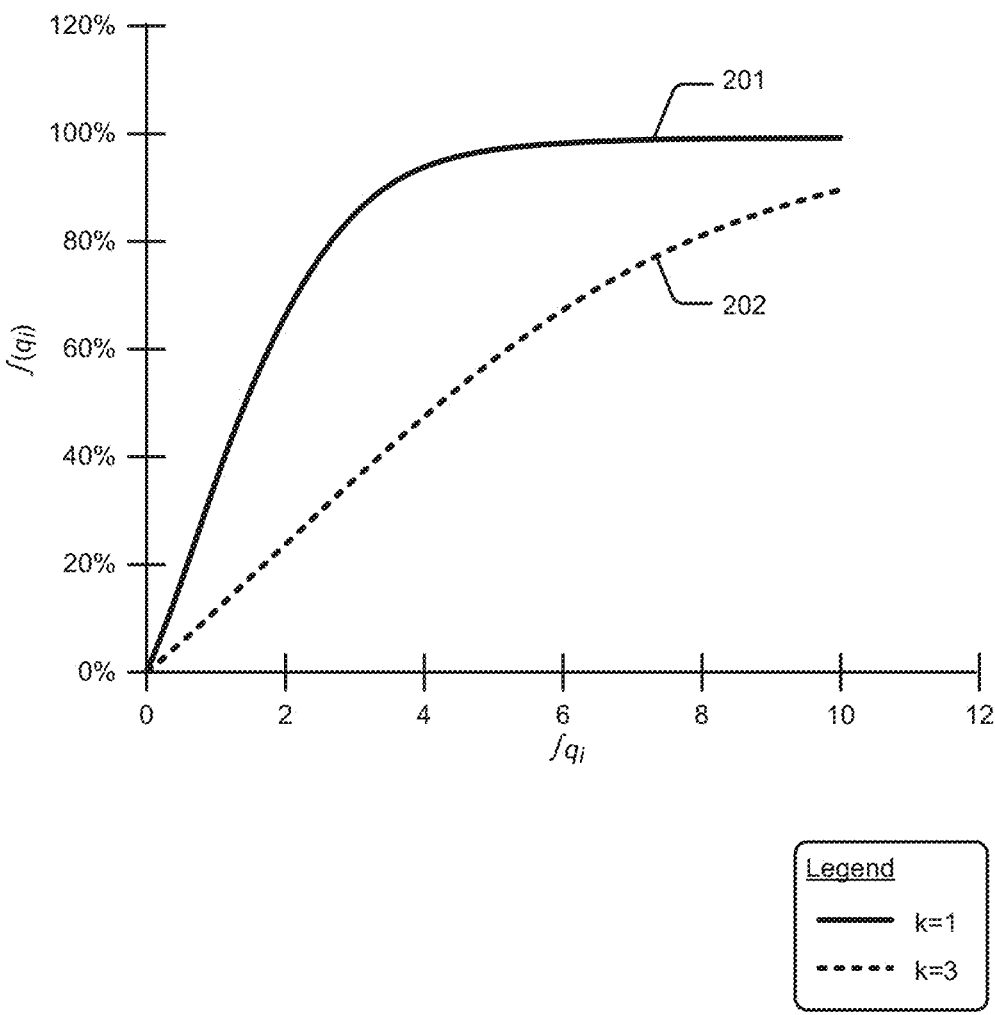

FIG. 1E2 presents a technique for forming communications that are directed to only influencers. More specifically, communication thresholding flow 1E200 serves to limit communications to only the identified top influencers. Moreover, communication thresholding flow 1E200 serves to personalize communications to those top influencers. For example, specific communications might be composed differently based on the type of the prediction or predictions As shown, the switch 191 within the FOR EACH prediction block operates to make a recommendation for action based on a particular prediction type. For example, if the prediction corresponds to an impending "dropout" (e.g., as determined by the flow of FIG. 1E1) then the output communication might include a recommendation to the influencer to consider an adjacent or alternative product (step $192_1$). In another case, if the prediction corresponds to predicted increased usage demands (e.g., as determined by the flow of FIG. 1E1) then the output communication might include a recommendation to the influencer to consider adding additional licenses (step $192_2$). For example, if the prediction corresponds to a particular product feature demand (e.g., as determined by the flow of FIG. 1E1) then the output communication might include a recommendation to the influencer to consider use of a particular feature (step $192_N$).

When the recommendations have been determined, then for only the top influencers, a communication is composed (step 193). Such a communication might avail of prestored, predetermined portions (e.g., the shown communication templates 198) of any communication. Once composed, the communication is addressed to the particular influencer in that iteration of the FOR EACH loop, and at step 194, the composed communication, together with any communication parameters are sent to the communication processor 150. The communications are thus sent to only the identified top influencers. Strictly as one example, the communication processor 150 might be a batch email system.

Data Structures, Equations and Metrics

Returning to the discussion of FIG. 1C, specifically the discussion of EQ. 5, it can be seen that the value k influences the shape of the curve corresponding to the function $f(q_i)$. Specifically, FIG. 2 shows different shapes of the curve $f(q_i)$ for varying values of k. A relatively steeper curve 201 corresponds to a k value of 1, whereas a relatively less steep curve 202 corresponds to a k value of 3. As can be seen, varying the value of k controls how quickly $f(q_i)$ converges to 1. This logistic function curve $f(q_i)$ is used in collaborative productivity models for measuring and reporting a user's individual productivity.

Any known technique can be used to adjust the shape of the curve to reflect different information profiles, in particular, differing magnitudes of information. Specifically, strictly as one example, the parameter k can be estimated empirically from the data to achieve a specific shape for $f(q_i)$, or it may be set to a predetermined value to meet certain characteristics. For example, if $f(q_i)$ is desired to approximately span as much of [0, 1] as possible in a quasi-linear fashion, then k is chosen as:

$$k = Q_{99}/5 \qquad \text{(EQ. 6)}$$

where $Q_{99}$ represents the 99th percentile of the q values in the data. The 99th percentile (as opposed to the 95th percentile, for example) is used because it is desired to better differentiate the big companies from each other. This also ensures that the maximum remains the same for a long time period. Similar results are obtained if a simple mapping function, such as $f(q)=\ln(q)$ is used.

Network Matrix N

The matrix N quantifies file sharing. It is given that $q_i$ is the total number of files generated by employee i and it is given that $q_{ij}$ represents the number of files shared from node i to node j. Therefore, matrix N is defined as follows:

$$N_{ii} = 1$$

$$N_{ij} = \frac{f(q_{ij})}{f(q_i)} \in [0, 1]$$

Therefore, $N_{ij}$ is the normalized fraction of files generated by i that are shared with j. The values in matrix N are all positive and are less than or equal to one.

Productivity Decomposition By Employee

The matrix N quantifies the standardized file-sharing metric $f(q)$, and defines the employee work flow network. The productivity measure for a company can be broken down by employee. This decomposition of the scalar function P is possible because the function is linear homogenous in vector $Q^{*T}$. Euler's theorem applies:

$$P = \frac{\partial P}{\partial Q_1^{*T}} Q_1^* + \frac{\partial P}{\partial Q_2^{*T}} Q_2^* + \dots + \frac{\partial P}{\partial Q_n^{*T}} Q_n^* \qquad \text{(EQ. 7)}$$

Each derivative $$\frac{\partial P}{\partial Q_i^{*T}}$$

multiplied by $Q^*_i$ is the productivity contribution $P_i$ of node i. All contributions $P_i$ can be calculated in closed form using the following vector derivative calculation:

$$P_i = \frac{\partial P}{\partial Q_i^{*T}} = \frac{1}{2P}(N \cdot Q^{*T} + N^T \cdot Q^{*T})Q_j^* \qquad \text{(EQ. 8)}$$

which gives an (n×1) vector of derivatives $P_i$. Once the amount of productivity that is contributed by each node is known, it can be used to pinpoint who are the most individually-productive users in the network.

Individual vs. Group Productivity

A total productivity value for a company can be characterized by summing individual contributions plus collaborative contributions (see EQ. 9). The diagonal of the foregoing network matrix represents the individual node's productivity when there is no collaboration between the nodes. Any productivity that occurs from collaboration will get captured in the non-diagonal elements of the matrix. Thus, total productivity contribution can be divided into two components as:

$$P = P_C + P_I \qquad \text{(EQ. 9)}$$

where:
P=total productivity contribution,
$P_C$=productivity due to collaboration, and
$P_I$=productivity due to individual contribution.
$P_I$ is computed using:

$$P_I = \frac{1}{n} \cdot \sqrt{\sum_{i=1}^{n} Q_i^2} \qquad \text{(EQ. 10)}$$

This is the result of using EQ. 2 where the network matrix contains no collaboration, i.e., is the identity matrix. Productivity due to collaboration can then be calculated based on EQ. 2 and EQ. 10, specifically $P_C=P-P_I$, where P is from EQ. 2 and where $P_I$ is from EQ. 10. In this manner, the value $P_I$ quantifies individual contributions based on the user-to-object interactions raised by individual users of the collaboration system over a given time period and the value $P_C$ quantifies collaboration activities between a given user and other users of the collaboration system over the same time period. In accordance with EQ. 9, the value for $P_I$ (contribution from individual activities) and the value for $P_C$ (contribution from collaboration), both of which correspond to a particular user over a particular time period can be added together to result in a total productivity contribution for the particular user over the particular time period. As such the highest contributing users (e.g., key influencers) can be identified, and as such, only the highest contributing users can be deemed to be the intended recipients of communications that are intended to motivate such highest contributing users to take an action that would further increase overall company productivity.

In some embodiments, $P_I$ (contribution from individual activities of a particular user) and $P_C$ (contribution from collaboration activities of a particular user) are each vectors, where each element of a corresponding vector can refer to a particular time period. For example, $P_I$ [1] tracks contribution from individual activities in a first time period (e.g., 1 week ago), and $P_I$ [2] tracks contribution from individual activities in a second time period (e.g., 2 weeks ago), and so on. And continuing this example, $P_C$ [1] tracks contribution from collaboration activities in the first time period (e.g., 1 week ago), and $P_C$ [2] tracks contribution from collaboration activities in a second time period (e.g., 2 weeks ago), and so on. As such, by combining vector $P_I$ with vector $P_C$ (e.g., using vector addition), a total productivity vector can be calculated.

Numerical Examples

Figure 3:
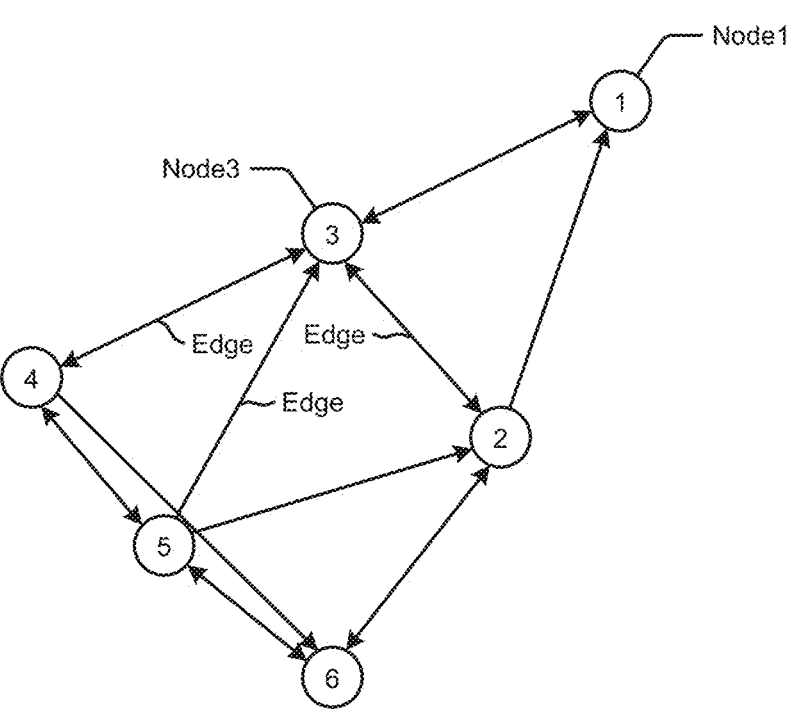
FIG. 3 is a network representation of a matrix as used in systems for measuring and reporting collaboration param- eters, according to an embodiment.

Strictly as an illustrative example, set the number of nodes to be 6 (the links between nodes are shown in FIG. 3). The corresponding vector q is shown below and has nodes that are ordered in increasing order of number of files generated. (Even though an ordered set of integers from 1 through 6 is used, this is not an index vector, but just the count of the number of files produced.) The network matrix N is also shown. Note that the diagonal of N is equal to 1, as there is a need to capture the individual productivity of each node.

$$q = \begin{pmatrix} 1 \\ 2 \\ 3 \\ 4 \\ 5 \\ 6 \end{pmatrix}$$

$$N = \begin{pmatrix} 1 & 0 & 1 & 0 & 0 & 0 \\ 0.50 & 1 & 1 & 0 & 0 & 0.50 \\ 0.33 & 0.67 & 1 & 0.67 & 0 & 0 \\ 0 & 0 & 1 & 1 & 1 & 1 \\ 0 & 0.20 & 0.40 & 0.60 & 1 & 0.80 \\ 0 & 1 & 0 & 0 & 0.67 & 1 \end{pmatrix}$$

Next, Q in [0, 1] is now bounded, and the constant i.e., k=5.95 is set. Using the quantum of information mapping function $f(q)$, the bounded Q is:

$$Q = f(q) = \begin{pmatrix} 0.06 \\ 0.12 \\ 0.18 \\ 0.24 \\ 0.31 \\ 0.37 \end{pmatrix}$$

The productivity metric is computed as follows:

$$P = \frac{1}{n} \cdot \sqrt{Q^T \cdot N \cdot Q} = 0.1615 \qquad \text{(EQ. 11)}$$

If there is no collaboration, then all that is gotten is individual productivity, as follows:

$$P_I = 1/n \cdot \sqrt{\sum_{i=1}^{n} Q^2} = 0.0973 \qquad \text{(EQ. 12)}$$

$$P_C = 0.0642147 \qquad \text{(EQ. 13)}$$

Further, define the percentage of "network" effect on productivity as:

$$\frac{P_C}{P} = 0.3975 = 39.75\% \qquad \text{(EQ. 14)}$$

Finally, the productivity decomposition by node is calculated using EQ. 8, shown as:

| Node | Decomposition | Decomposition (%) |
|------|---------------|-------------------|
| 1 | 0.0022 | 1.34 |
| 2 | 0.0122 | 7.58 |
| 3 | 0.0180 | 11.15 |
| 4 | 0.0340 | 21.03 |

-continued

| Node | Decomposition | Decomposition (%) |
|------|---------------|-------------------|
| 5 | 0.0438 | 27.10 |
| 6 | 0.0514 | 31.80 |
| TOTAL | 0.1615 | 100.00 |

Additional Properties

Some additional properties and intuition of the metrics that have been described in the previous subsection are further highlighted below.

1. If Q is scaled by α>1, then the value of P will also scale accordingly. That is, if file production is increased by 20%, productivity will become αP. To see this, assume a scaling factor α=1.20 and multiply Q by α. Then the new productivity value becomes:

$$P = \frac{1}{n} \cdot \sqrt{(\alpha Q)^T \cdot N \cdot (\alpha Q)} = 0.1938 \qquad \text{(EQ. 15)}$$

which is exactly 0.1615×α.

2. A check is made to confirm that productivity per node is insensitive to the changes in the number of nodes, provided the structure of the system remains the same. This is checked by simulating many networks to see how the P measure varies. To begin, a network of six nodes is randomly generated 100 times, P is computed each time, then the mean P and the summary statistics for the 100 trials are analyzed. For this experiment, a different set of values is used so as to run a controlled experiment. All values in the Q vector are set to be equal to 0.35. It is assumed that the probability of a directed link is 0.5. The N matrix is, again, randomly generated 100 times and P is computed each time. Next, the same experiment is performed with the network size being increased from n=6 to n={10, 20, 100, 500, 1000} nodes. What is shown is that the productivity metric remains in the same range as before, though it tends to decline mildly, and asymptote eventually. As n grows the standard deviation reduces sharply, increasing the accuracy of this property as networks become larger.

Number of Nodes n

| | Number of Nodes n | | | | |
|---|---|---|---|---|---|
| | 10 | 20 | 100 | 500 | 1000 |
| Mean P | 0.2601 | 0.2519 | 0.2488 | 0.2477 | 0.2476 |
| Median P | 0.2596 | 0.2542 | 0.2489 | 0.2478 | 0.2476 |
| Std dev P | 0.0101 | 0.0058 | 0.0011 | 0.0003 | 0.0001 |

Large Data Analysis

Data Structure

Here-below are described the features of productivity across all companies in the sample. The sample considered in this illustrative example covers several hundred companies over the period early March to mid July 2018 (16 weeks), where daily file-sharing interactions between users are recorded, amounting to a total of 30 million records of data. If two users interacted on a file during the day it is counted as an "action" regardless of how many times the two users engaged that day on that file. An action requires that a user i sends a file to user j who then opens, previews, or downloads this file, else it does not count as an action.

Interactions are captured in the network matrix N and the individual productivity vector Q. This is shown by way of example in FIG. 4.

File sharing between any two users on a given day is denoted as a "transaction" and may involve any number of files and actions, though the most common number of files shared on a transaction are 1 or 2 files. The aforementioned transactions can include any of, a file open transaction, or a file preview transaction, or a download transaction.

Since the number of actions per file may be very large when a single file is sent to all users (such as with blast emails sent by human resources), the maximum number of actions is set to the 95th percentile value of the actions in order to trim such egregious outliers. (For example, in the case of one large company, the number of users who uploaded files in the sample period was 2,856, and the 99th percentile of the number of actions is 26.)

Since a user may send a file to more than one receiver, the number of actions may be greater than the number of files. The data file also contains details of the Sender and Receiver IDs, their company IDs, file type, file count and the number of actions. File sharing for a given company involves users who are part of the same company (i.e., internal) and those who are not, i.e., external users.

Network Metrics

Next, the data is used to construct the network adjacency matrix N and productivity vector Q as discussed in the foregoing Productivity Metric and Productivity Decomposition sections. Any granularity may be chosen for network construction, such as daily, weekly, monthly. All metrics are chosen to present using non-overlapping weekly blocks of data, where a week is defined as Monday through Sunday.

For each week, the following measures are constructed for each user in the network (vectors of size n, the number of users):

1. A vector of eigenvalue centrality scores, which quantifies the importance of user position in the network.
2. A vector of betweenness centralities, the values of which vector are proportional to how many shortest paths in the network go through a user node. This signifies the importance of a user as being a broker or middleman in the file sharing network.
3. A vector of node degrees, i.e., how many other users a node is connected to.
4. A vector of individual contributions to productivity based on EQ. 8.
5. A flag for internal versus external user.

Aggregate weekly measures are also calculated for the entire company, i.e., the following scalar values:

1. The productivity score P in each week, and the breakdown of this score into individual contribution $P_I$ and collaborative contribution $P_C$.
2. The amount of productivity contributed by internal versus external users.
3. The number of links in the network, and the average degree.
4. Density of the network, i.e., the number of links in the network divided by the total possible links, $n(n-1)/2$.
5. The average size of communities in the network. Communities are detected using a standard community detection algorithm, the greedy algorithm.
6. The percentage productivity contributed by the top 5% of users.
7. Fragility (or virality), which is a measure of how fast information can spread on the network. This is a function of the concentration in links in a few nodes, and is measured as $E(d^2)/E(d)$, where d is the degree of each node, and E(x) stands for the mean over all x values. The numerator of this measure is analogous to the standard measure of concentration used by economists, the Herfindahl index.

8. Also, data is gathered on weekly active users (WAU) in terms of the percentage of total users. "Active" users are the users who logged into the file-sharing platform at any point in time during the week. For graphing purposes, the data is smoothed to report the rolling weekly average each day.

Empirical Examples

Figure 5:
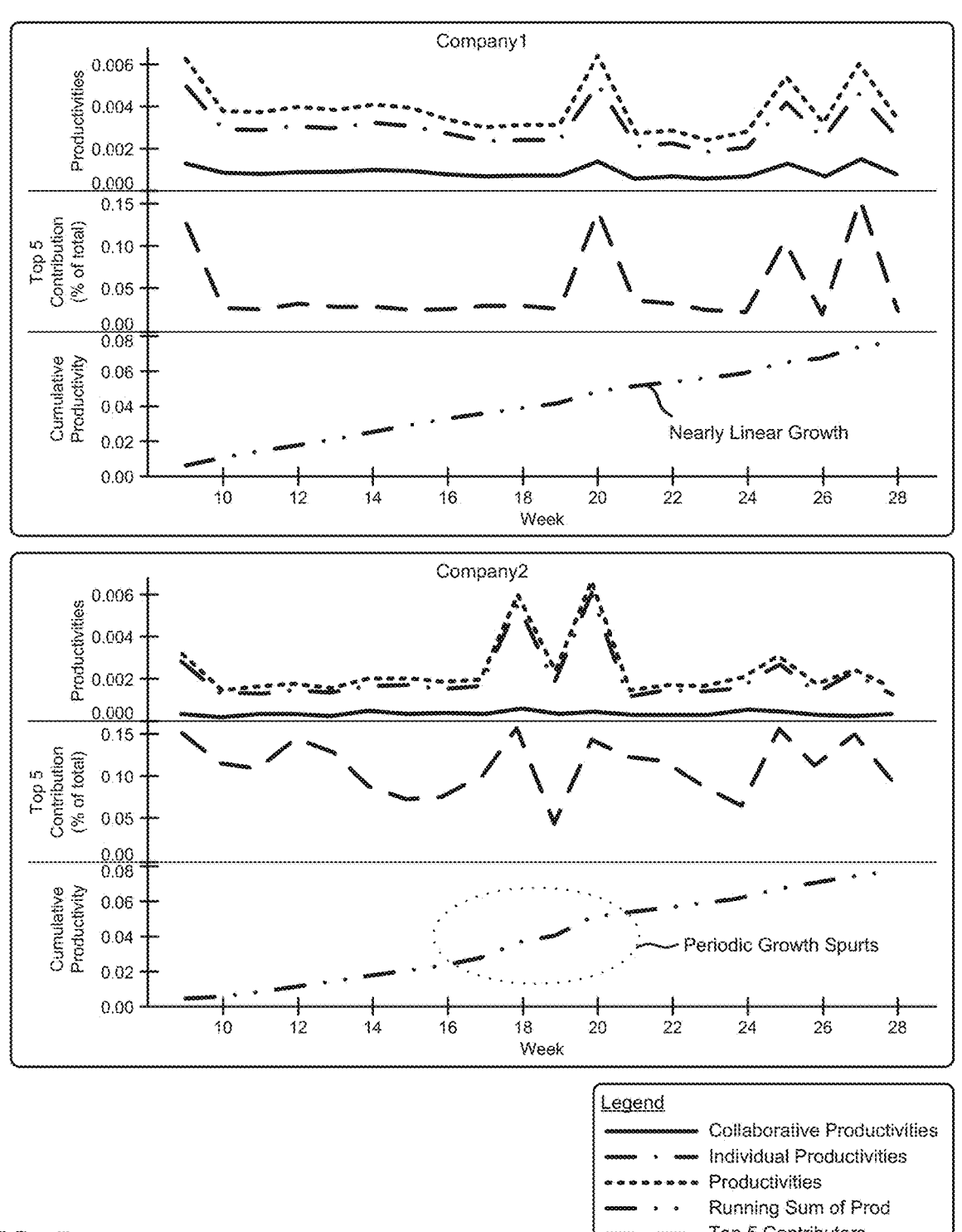
FIG. 5 presents several productivity parameter plots as used for reporting collaboration parameters, according to an embodiment.

FIG. 5 shows the productivity per employee for two sample companies over time. company productivity, average collaborative productivity, and individual productivity all follow each other closely. Collaborative productivity is much lower than individual productivity across all weeks. Cumulative productivity is almost linear for the first company, i.e., productivity remains steady week over week, though in the bottom plot it can be seen that there is a slight kink where productivity ramps up. In the first company, productivity tracks those of the top five contributors, meaning that they are key players. However, this relationship is less marked in the case of the second company. Overall, it is shown that company productivity does correlate with that of the top few users.

Figure 6:
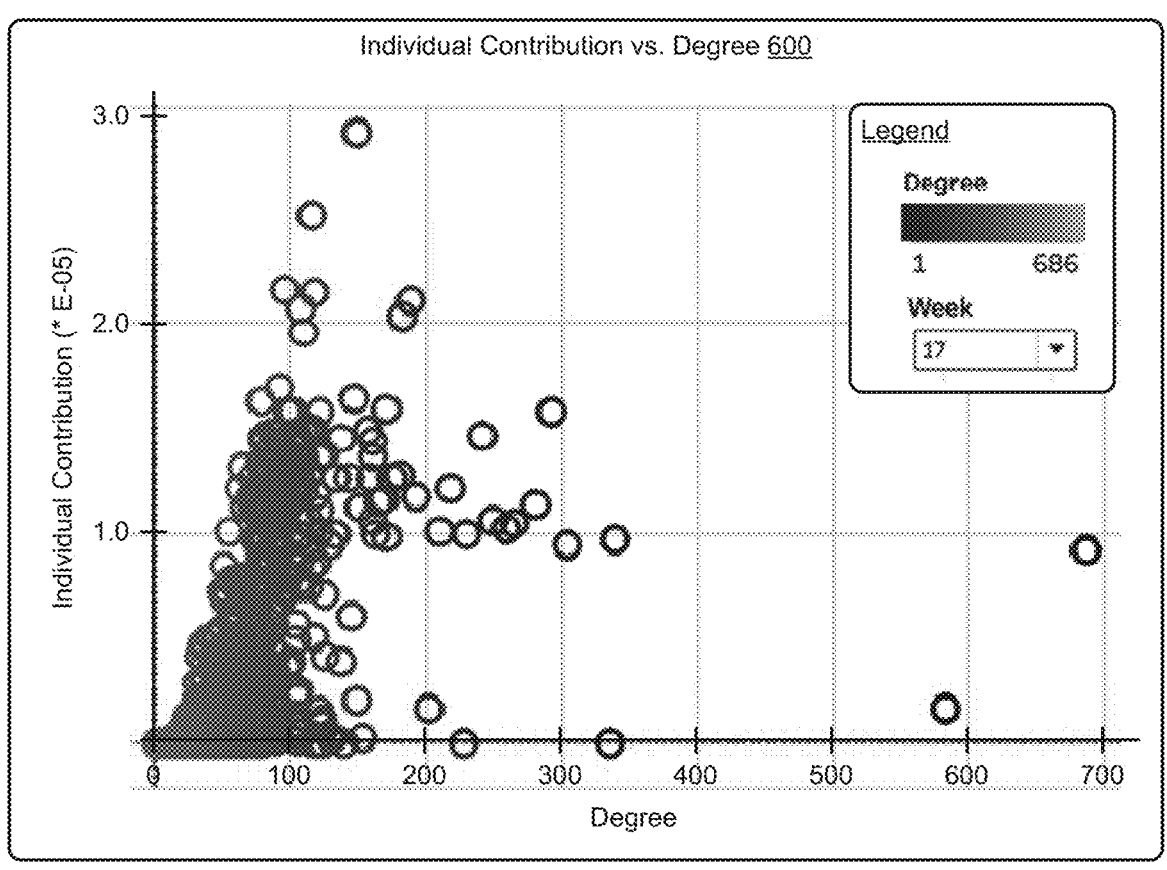
FIG. 6 presents an individual contributor productivity contribution plotting technique as used in systems for rec- ommending collaboration remediations, according to an embodiment.

Metrics may also be examined within a week, for example, in FIG. 6 the user's productivity contribution is plotted against the degree of the user, i.e., how many connections they have. Users on the lower right are those with many connections but not too much individual file production, whereas those at the top left have few connections, but generate many files. The user on the extreme right has many connections and also a reasonable level of contribution and may be a good example of a connector, yet, the user at the topmost point in the plot is contributing a lot to the total. The former is more of a connector, but the latter is more of a producer.

Figure 7A:
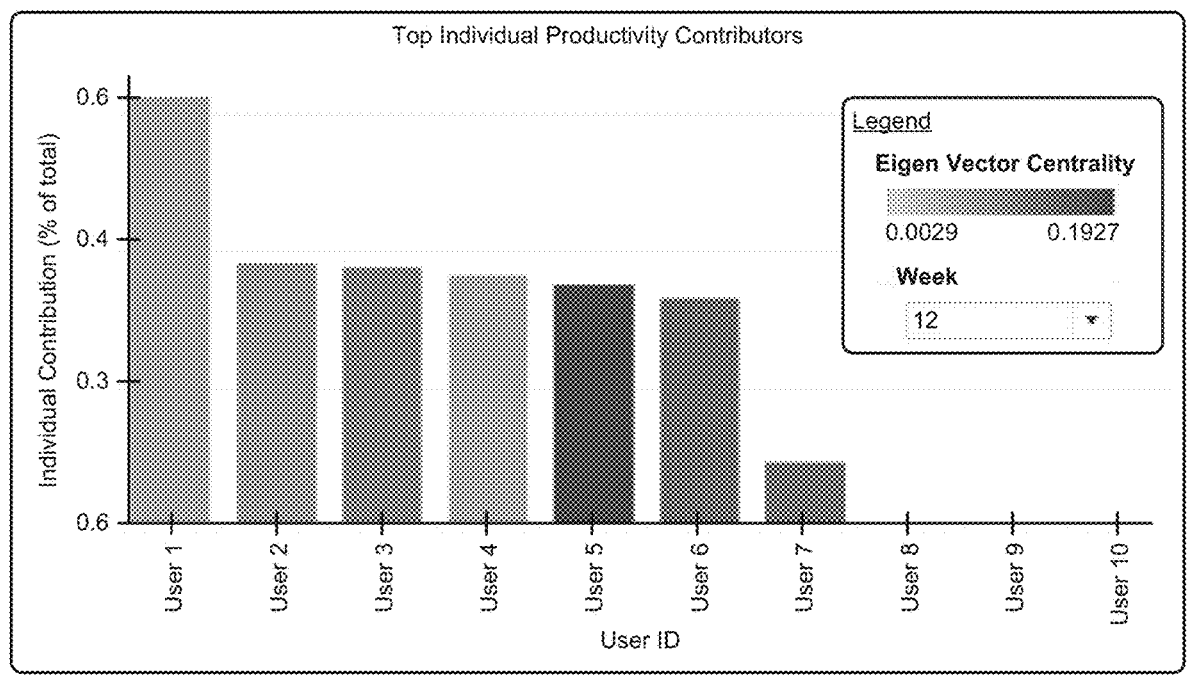
FIG. 7A is a graph depicting top-M individual productivity contributors as used in systems for recommending collaboration remediations, according to an embodiment.
Figure 7B:
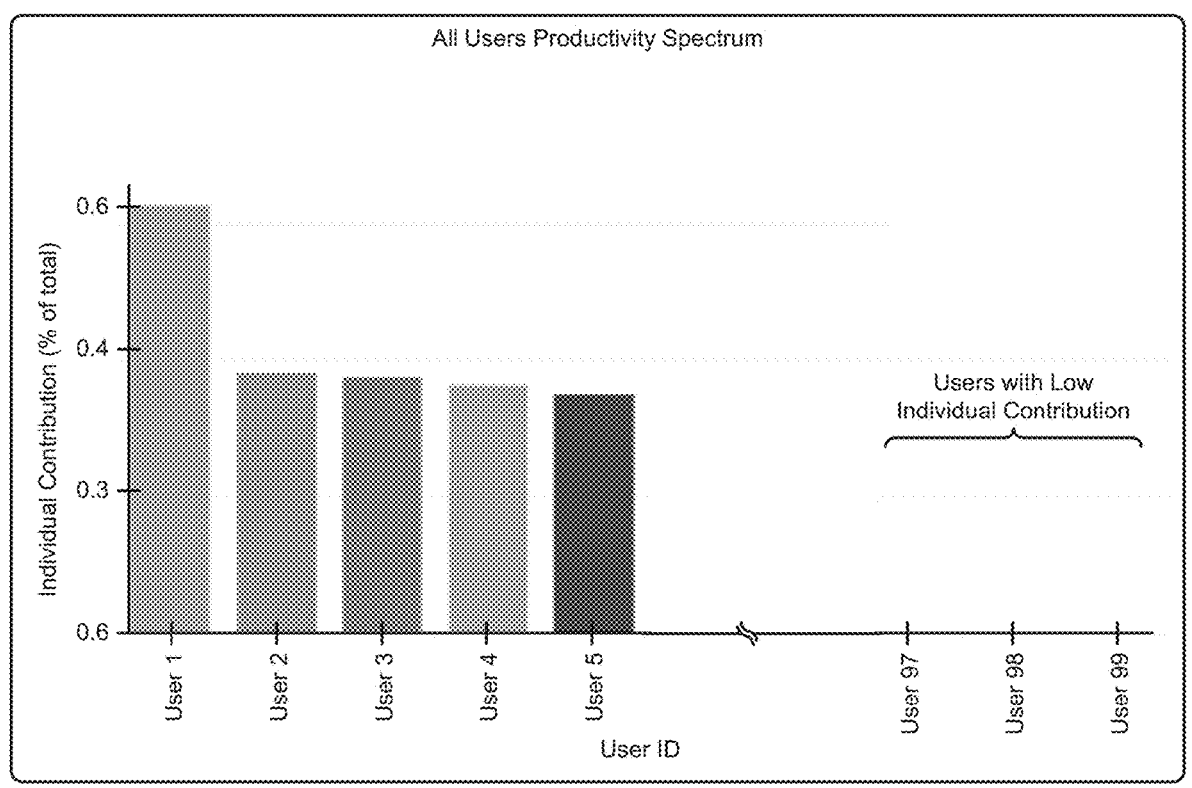
FIG. 7B is a graph depicting lowest individual productivity contributors as used in systems for recommending collaboration remediations, according to an embodiment.
Figure 8:
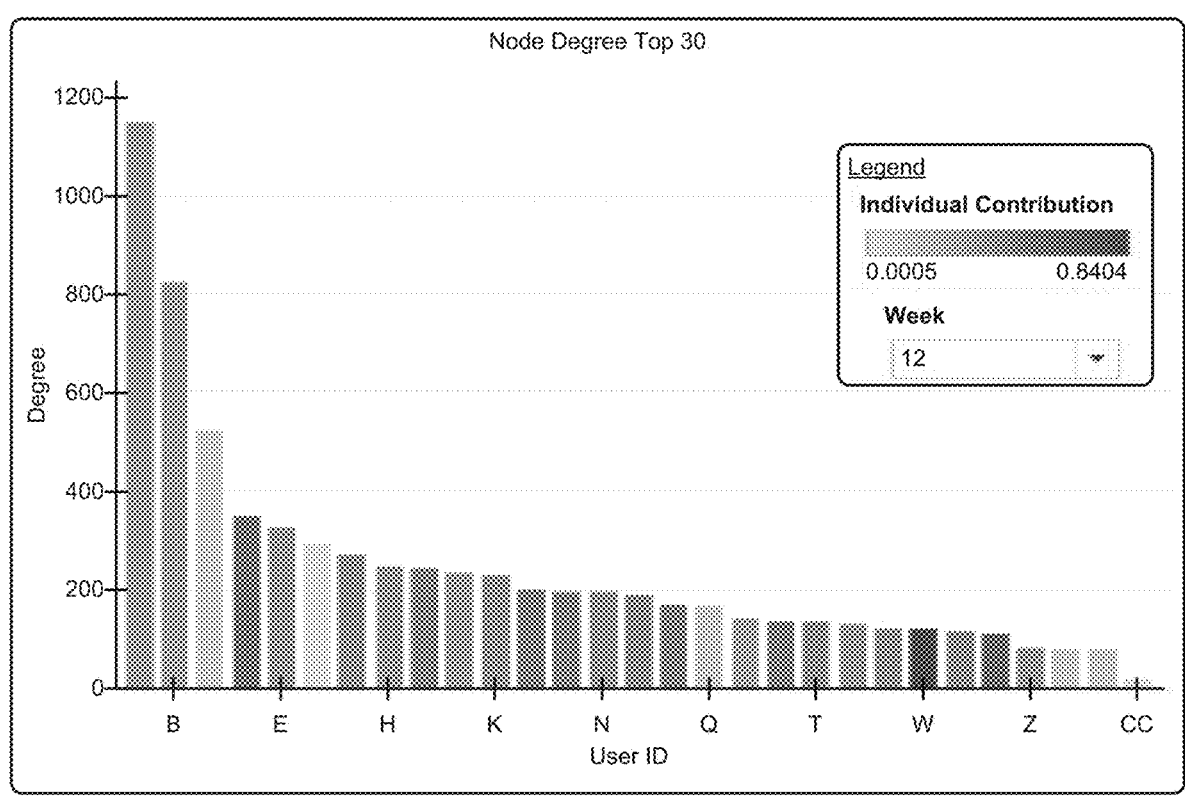
FIG. 8 presents a degree-based productivity contribution reporting technique as used in systems for recommending collaboration remediations, according to an embodiment.

Similar analyses of users are shown in FIG. 7A, FIG. 7B and FIG. 8. In FIG. 7A it is observed that the top individually productive users may not necessarily be the most central in the network. In FIG. 7B it is observed that lowest contributing users may not necessarily be poorly performing, but merely that they are ranked low due to low or no measured activity. For example, some users who are deemed to be low contributing users might be new users for whom there has been only a short time period for collecting activity data. Or, some users who are deemed to be low contributing users might be external users who are merely recipients of files produced by internal users. In FIG. 8 it is observed that the most connected users (in terms of degree) may not necessarily be the highest contributors to productivity. The foregoing observations drive further analysis to determine a group of users who might, either individually or collectively, be motivated to take action to improve collaboration throughout the company. Those users deemed to be key influencers are one such group. An example scenario involving key influencers is provided infra.

Analyzing Key Influencers

In this particular example, key influencers are defined to be the top 5% of total productivity based on the sorted productivity decomposition (D) vector generated using EQ. 7. The vector $D_{ct}$ refers to company c in week t.

Another analytical question is asked: "Do the top producers change a lot or remain stable? To answer this question quantitatively, the Jaccard similarity is computed between sets of key influencers in two consecutive weeks to answer this question. For every pair of consecutive weeks in a company, the similarity between the top contributors is calculated as follows:

$$\text{Jaccard } similarity_{ct} = \frac{|D_{c,t-1} \cap D_{c,t}|}{|D_{c,t-1} \cup D_{c,t}|} \in (0, 1) \qquad \text{(EQ. 16)}$$

Figure 9:
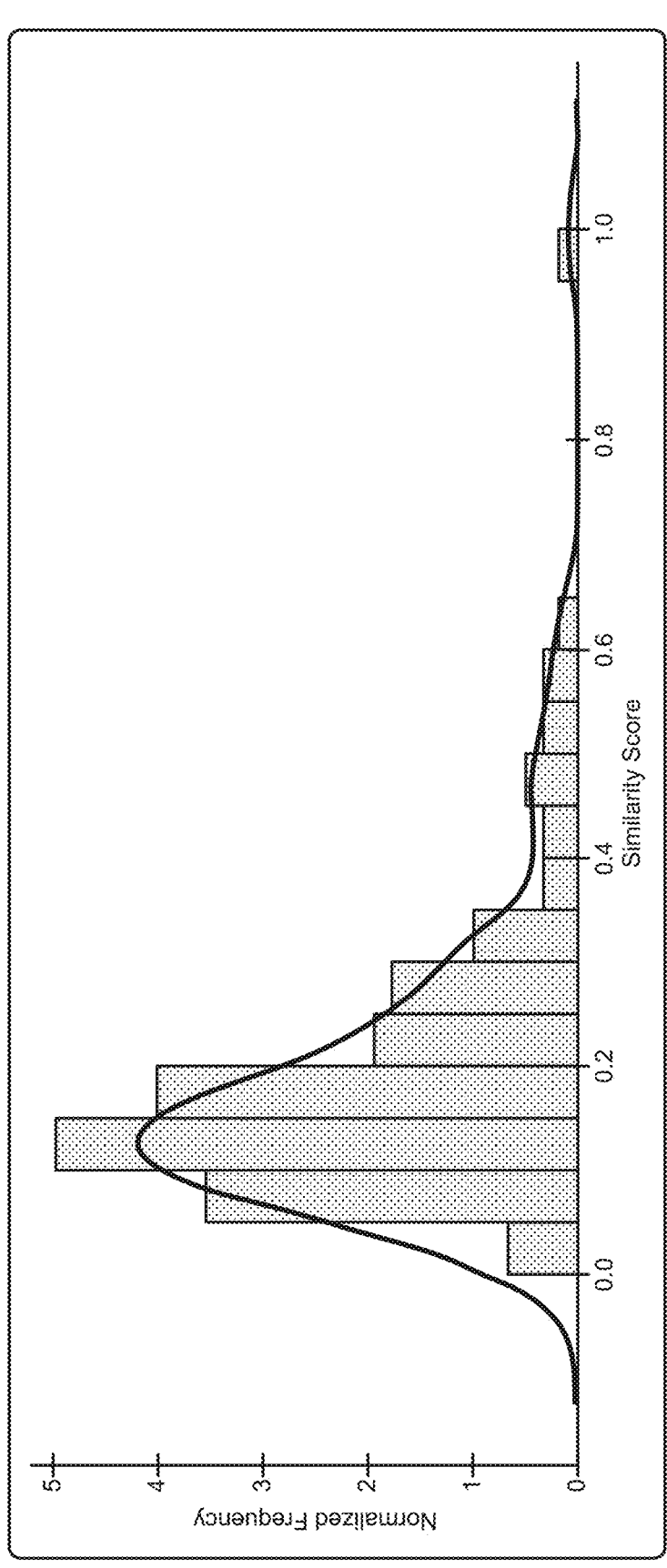
FIG. 9 presents use of Jaccard similarities as used in a company-wide productivity contribution reporting technique as used in systems for recommending collaboration remediations, according to an embodiment.

That is, for each company, the average Jaccard similarity is calculated across all weeks to determine how much consistency there is in top contributors. The histogram of sample companies' productivity similarity can be used to examine the distribution of stability in top contributors. See FIG. 9. Mean and modal similarity is around 0.2, suggesting that for many companies, top producers change from week to week. There is a long right tail, which indicates that for a small fraction of companies, there is stability across time in the top productivity employees.

External vs. Internal Users

Each company on the file-sharing platform has users who are employees of the company (internal) and also users who are not employees or contractors (external). Productivity decomposition is examined by user type: The analytical question is asked, "Are users who collaborate with external users more productive?" Three types of users are considered:

1. internal users who only connect to internal users,
2. internal users who connect to external users, and
3. external users.

Figure 10:
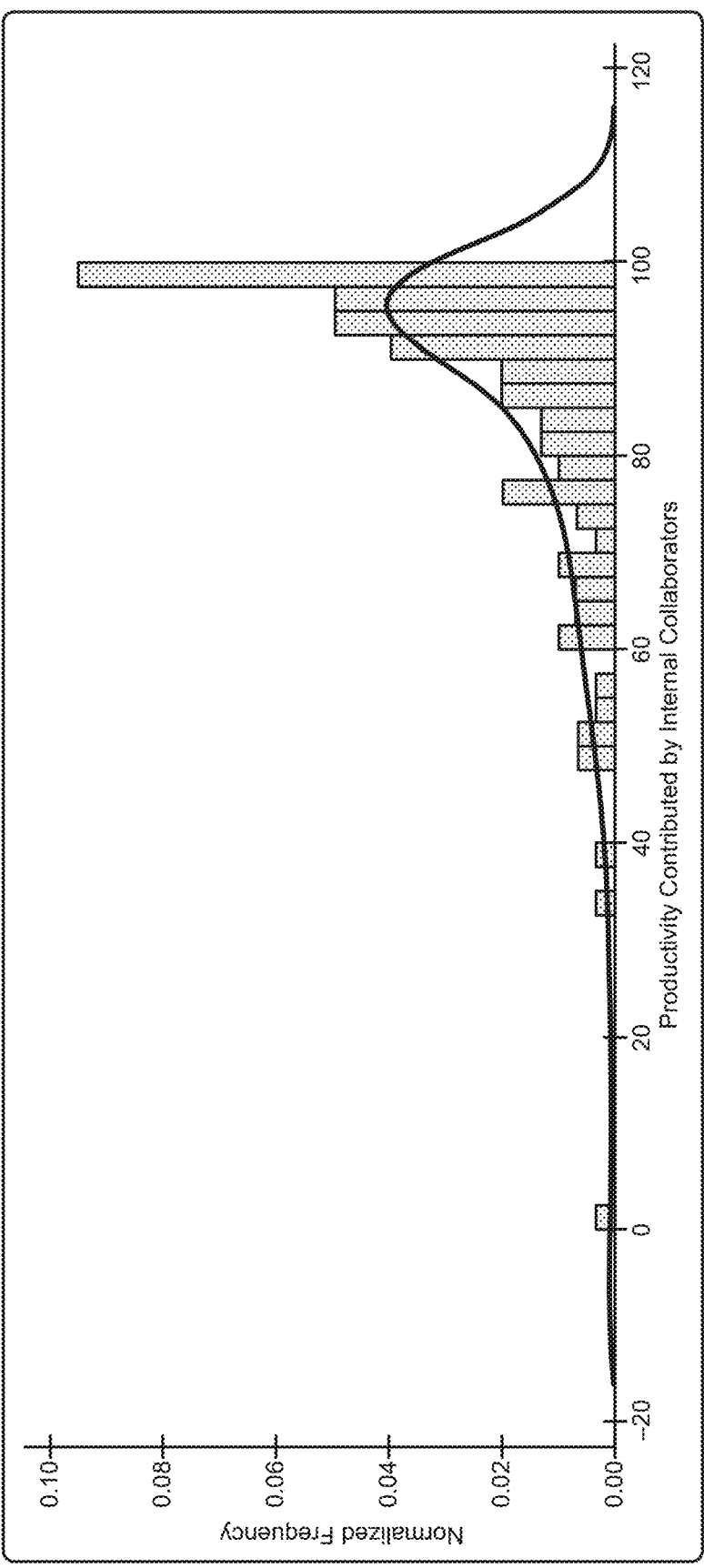
FIG. 10 presents use of a histogram used in an intra-company productivity contribution reporting technique as used in systems for recommending collaboration remediations, according to an embodiment.

For each company, for each week, the percentage of productivity contributed by each of these three groups are computed and stored. Also, the average share of productivity in each type as well for each company are computed and displayed the histogram. As shown in FIG. 10, most of the productivity comes from internal users who connect with other internal users. In this example, case, the share of productivity from external users is minimal, which is understandable because the external users comprise only a small fraction of the total user base of the company.

Comparing Low and High Productivity Weeks

Drivers of productivity can be derived from a comparison of metrics between the minimum and maximum productivity weeks. One possible algorithm for doing so is given in FIG. 11.

Network density, average degree, concentration of productivity in the top 5% of users, and average community size are shown to be correlated with higher productivity per user. Therefore, denser networks with key influencers drives productivity. On the other hand, too many nodes, skewed degree of nodes, a large number of communities, and higher fragility are associated with lower productivity per user. This is because too many users are segmented into communities, leading to lower transmission of productivity across the company. In the cross-sectional analysis, these insights will be useful in determining which network metrics are correlated to:

1. productivity across companies, and
2. predict weekly active users.

These statistics are corroborated by the correlation of productivity with the network measures, specifically, an algorithm can be applied for determining negative and positive correlations across a set of productivity metrics. The algorithm shown in the flowchart of FIG. 11 commences upon identifying and select a set of productivity measures (step 1102) and a representative set of users (step 1104). A time period is selected such that both a period of high user productivity is included in the time period as well as a period of low user productivity (step 1106).

In some cases, a long time period might be of interest. To accommodate long time periods, rather than create very large data structures that correspond to very long time periods, some embodiments persist foregoing data structures such that they can be merely accessed for reading the contents of the persisted pre-populated data structures rather than constructing them anew. More specifically, a derivative of a data structure corresponding to a first time period is persisted before creating a later second data structure corresponding to a later time period. In this manner, the computing demand can be lessened when performing analysis over long time periods. In some cases, any of the foregoing data structures can be persisted on a regular basis (e.g., one a week). In some cases, use of the foregoing persisted data structures can reduce computer resource demand by 50%, or by 60%, or by 70%, or by 80% or more, thus leading to efficient use of computing resources.

Step 1108 serves to normalize the productivity metrics across all users. In some cases, the productivity metrics originate for different tools. When this happens, normalized values are calculated to the greatest level of precision. For example, a "files per week" metric from one tool and a "files per day" metric from another tool, the "files per day" metric would be used as the normalization baseline. Any "files per week" metric value would be divided by 7 to normalize into "files per day".

After normalization, the selected set of productivity measures are correlated so as to determine which metrics correlate to high user productivity and which metrics correlate to low user productivity (step 1110).

Predicting Client Activity

In this section it is assessed whether the productivity measure P and other network-based metrics have predictive power to determine WAU (the ratio of weekly active users to all users). A model is fit to predict WAU in week t using a feature set constructed from data in weeks t−12 through t−1, i.e., the past 12 weeks of data. One model is fit to the cross-section of client companies and use rolling experiments. The dataset used is merely an exemplar that is chosen to support analysis of three sample prediction periods.

For example, a feature set constructed from weeks 1-12 to fit WAU in week 13 is used. This trains the prediction model in-sample. Then this fitted model and use data from weeks 2 through 13 to predict week 14 out-of-sample as a test of the model is taken. Since there are 16 weeks of data, it is possible to run three experiments, predicting out-of-sample WAU for weeks 14, 15, and 16. A model training schematic is shown in FIG. 12 and a representative set of model training parameters is given in FIG. 13A and FIG. 13B.

Selecting and Pre-Processing Data for Predictive Model Training and Validation

Figure 12:
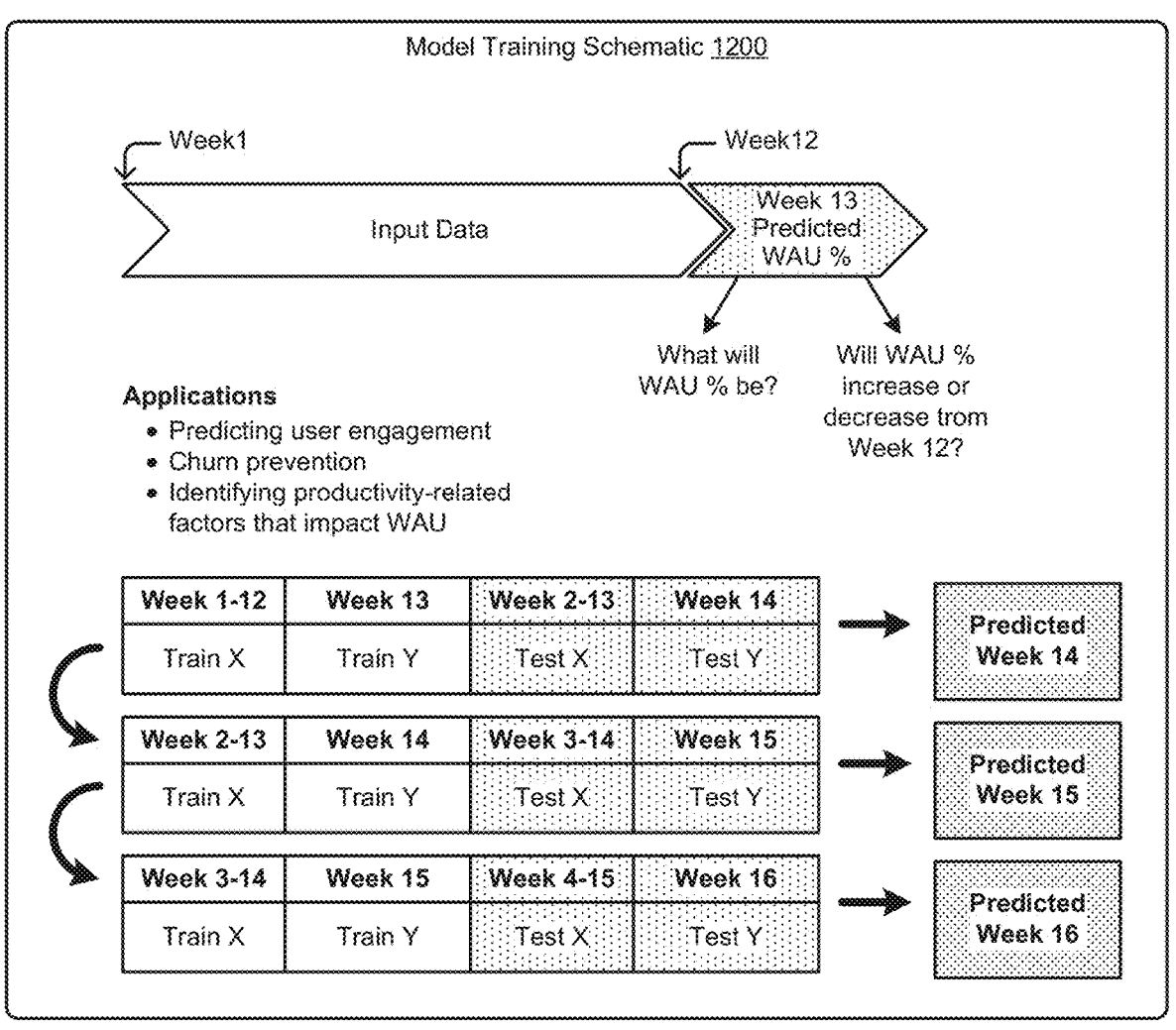
FIG. 12 is a schematic showing a model training technique as used in systems for recommending collaboration remediations, according to an embodiment.
Figure 13A:
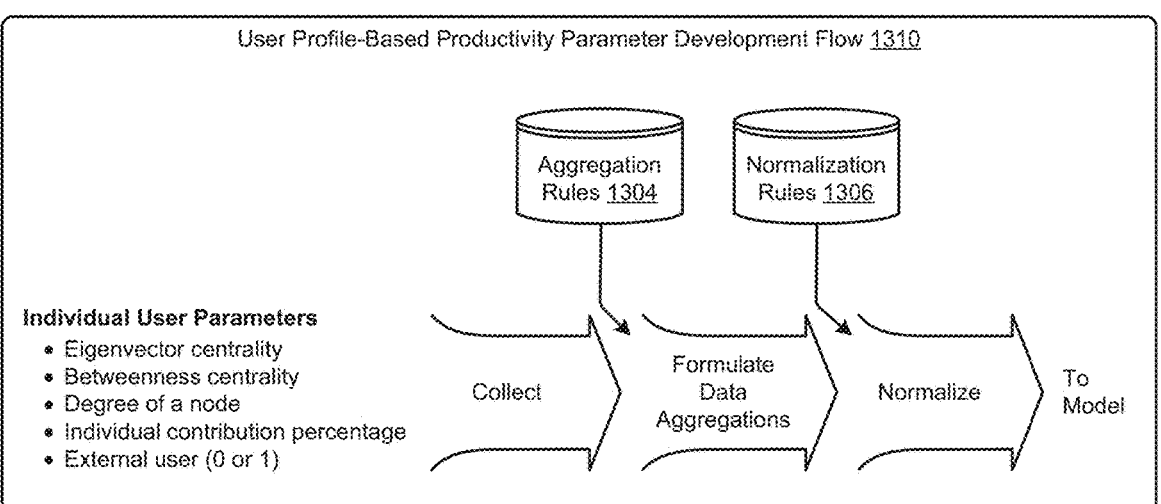
FIG. 13A presents a user profile-based productivity parameter development flow, according to an embodiment.

FIG. 12 shows how two sets of data from two different time periods can be used to train and validate a predictive model. FIG. 13A shows a user profile-based productivity parameter development flow 1310. As shown, after collection of a set of raw user profile-based productivity parameters, those parameters can be processed in accordance with aggregation rules 1304 to formulate data aggregations using previously captured data, which data aggregations are in turn normalized in accordance with normalization rules 1306 and then set to the predictive model. Strictly as one example, a moving average (e.g., over a recent time window) of any given parameter might have high predictive value, and as such, the movement of the value of that parameter over time can be aggregated as an average for the time window. The time window can be moved incrementally, and another aggregated average can be calculated and provided to the predictive model as a model variable. As one practical example, a precise prediction of impending increased usage can be made even more precisely or confidently if the previous week showed an increased usage average for the week. Continuing, prediction of impending increased usage can be made still more precisely or still more confidently if the previous month showed an increased usage for the month.

Figure 13B:
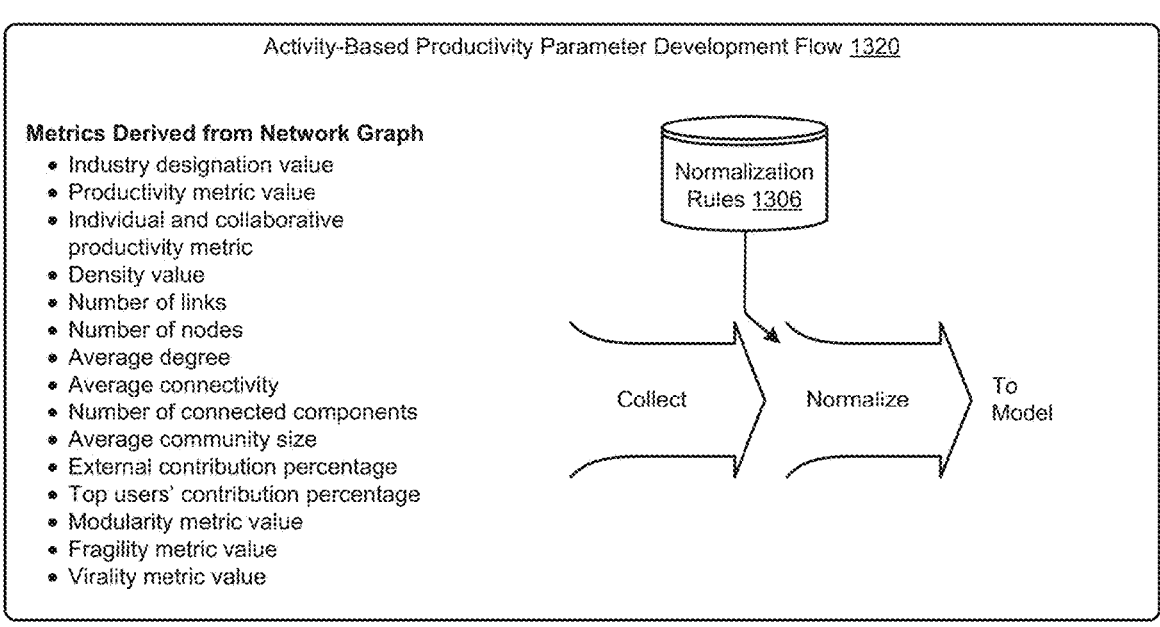
FIG. 13B presents an activity-based productivity parameter development flow, according to an embodiment.

FIG. 13B shows an activity-based productivity parameter development flow 1320. As shown, after collection of a set of raw activity-based productivity parameters, those parameters can be processed in accordance with normalization rules 1306 and used for training and validating the predictive model.

In this setting as shown and described as pertains to FIG. 11, FIG. 12, FIG. 13A and FIG. 13B, there are two analytical objectives for the model. Objective One: predict WAU for a client in the following week (this is a "regression" exercise). Objective Two: predict the direction of WAU next week, i.e., the sign of the change in WAU (a "classification" experiment). The naive model for prediction would be to assume that the prediction of WAU for any week is based on the average WAU for the past 12 weeks, which is one variable in the feature set. To this naive variable, the various network measures that were described in the Network Metrics section are also added. If any variables are highly correlated with each other (collinear) one of these variables is eliminated. This results in an abridged, clean dataset, which can then be used for prediction. In some cases, user-specific features in the model are based on parameters found in a given user's profile data. A representative sample of these user-specific features are those given in the foregoing FIG. 13A. In some cases, activity-based features in the model are based parameters found in the network graph. A representative sample of these activity-based features are those given in the foregoing FIG. 13B.

Different machine learning models can be used for prediction. However, the most successful ones have been shown to be random forest, gradient boosting, xgboost, and MLP regression models. Of these, the results from xgboost are reported, which offered the best results. The results are shown in Table 1. The prediction model does very well in matching actual WAU in level terms. This can be seen from the fact that the slope coefficient in the regressions lies between 0.9 and 1.0, and the slope is statistically close to 1, though it is always less than 1, suggesting that the model marginally overestimates the next week's WAU. It also improves on the prediction error over the naive model by approximately 15%-30%.

TABLE 1

| Metrics of the classification model | | | |
|---|---|---|---|
| Metric | Week 14 | Week 15 | Week 16 |
| MSE (out-of-sample) | 0.0026 | 0.0038 | 0.0032 |
| MSE (naive) | 0.0033 | 0.0044 | 0.0045 |
| % Error reduction | 21.4% | 15.3% | 28.6% |
| Coefficient | 0.9306 | 0.9031 | 0.9296 |
| Adjusted $R^2$ | 0.92 | 0.89 | 0.91 |

In the top half of the table, the mean squared prediction error (MSE) is presented for both the naive model (only using past 12-week average WAU) versus the full model that also uses network variables. In the bottom half, the coefficient of a regression of the actual WAU on predicted WAU from the full model are presented and it is shown that these coefficients are statistically very close to '1' being suggested as a good predictive model. The $R^2$ is also reported to see how much variation is captured, and these are above 90% meaning that most of the variation in the actual WAU is captured by the predicted WAU. All coefficients are highly significant at the 99.99% level (t-stats not reported).

Next, the question of how well the model is able to predict the direction of change in WAU for each client is assessed. This is of interest because attention may be directed to clients whose WAU is predicted to drop. The confusion matrices for the prediction of the three experiments are shown in Table 2. The diagonals are heavy indicating that the models perform well. Accuracy is about 70%, as are precision, recall, and the F1 score. Model performance is stable across time. In sum, a model supported by graph-theoretic features is able to measure productivity and use it to forecast the usage of a file-sharing platform.

TABLE 2

| Confusion matrices for the three experiments | | | | |
|---|---|---|---|---|
| | Actual | | Metric | Value |
| Week 14 | | | | |
| Predicted | 0 | 1 | Accuracy | 0.72 |
| 0 | 132 | 58 | Precision | 0.74 |
| 1 | 89 | 248 | Recall | 0.81 |
| | | | F1 | 0.77 |
| Week 15 | | | | |
| Predicted | 0 | 1 | Accuracy | 0.68 |
| 0 | 144 | 82 | Precision | 0.71 |
| 1 | 89 | 214 | Recall | 0.72 |
| | | | F1 | 0.71 |
| Week 16 | | | | |
| Predicted | 0 | 1 | Accuracy | 0.69 |
| 0 | 176 | 96 | Precision | 0.73 |
| 1 | 68 | 188 | Recall | 0.66 |
| | | | F1 | 0.70 |

In these cases, 0 stands for the case where the WAU declined and 1 for when it increased versus the average WAU of the past 12 weeks. Accuracy, precision, recall, and the F1 score are also reported.

Concluding Discussion

The foregoing presents a new productivity metric P based on a novel network model of file-sharing amongst users within a client company. The metric P may be decomposed into productivity coming from individual effort and from collaborative effort. A decomposition of total productivity is also possible by user so as to identify the most productive employees. This network approach generates several metrics at both, user and company level, enabling the creation of a rich feature set for predicting platform metrics.

Using a sample of ~525 client companies, over 16 weeks, comprising about 30 million file-sharing records, predicting client usage of the file-sharing platform is improved over a model where the past 12-week average is used as the prediction. Accuracy levels are high when predicting the level of the percentage of active users on the platform, and also when predicting the sign of change in percentage of active users.

The feature set supports many other analyses as well. With longer time-series of data, predicting churn, i.e., client dropout, becomes feasible. Clustering and classification of companies and users by productivity is supported. User engagement can be predicted. And of course, analyses may be provided to clients to enable them to make their companies more productive, while also offering a weekly measure of productivity to track improvements in collaboration.

Additional Embodiments of the Disclosure

Additional Practical Application Examples

FIG. 14A depicts a system 14A00 as an arrangement of computing modules that are interconnected so as to operate cooperatively to implement certain of the herein-disclosed embodiments. This and other embodiments present particular arrangements of elements that, individually or as combined, serve to form improved technological processes that address the issue that managers of collaboration systems have no way to empirically gauge how collaborators are working together. The partitioning of system 14A00 is merely illustrative and other partitions are possible. As an option, the system 14A00 may be implemented in the context of the architecture and functionality of the embodiments described herein. Of course, however, the system 14A00 or any operation therein may be carried out in any desired environment. The system 14A00 comprises at least one processor and at least one memory, the memory serving to store program instructions corresponding to the operations of the system. As shown, an operation can be implemented in whole or in part using program instructions accessible by a module. The modules are connected to a communication path 14A05, and any operation can communicate with any other operations over communication path 14A05. The modules of the system can, individually or in combination, perform method operations within system 14A00. Any operations performed within system 14A00 may be performed in any order unless as may be specified in the claims. The shown embodiment implements a portion of a computer system, presented as system 14A00, comprising one or more computer processors to execute a set of program code instructions (module 14A10) and modules for accessing memory to hold program code instructions to perform: observing user-to-object interactions and user-to-user interactions raised by users of the collaboration system over a time period (module 14A20); constructing a first data structure to track a first set of values that characterize user-to-object interactions raised by individual users of the collaboration system (module 14A30); constructing a second data structure to track a second set of values that characterize observed events over content objects that are shared between a given user and other users of the collaboration system (module 14A40); correlating, for the individual users of the collaboration system, the first set of values of the first data structure with the second set of values from the second data structure to calculate or otherwise characterize a total contribution amount for the individual users of the collaboration system (module 14A50); identifying a set of communication recipients by ranking the individual users based on the total contribution amount (module 14A60); and sending a communication to the identified set of communication recipients (module 14A70).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations. For example, FIG. 14B depicts system 14B00 that comprises at least one processor and at least one memory, the memory serving to store program instructions corresponding to the operations of the system. As shown, an operation can be implemented in whole or in part using program instructions accessible by a module. The modules are connected to a communication path 14B05, and any operation can communicate with any other operations over communication path 14B05. The modules of the system can, individually or in combination, perform method operations within system 14B00. Any operations performed within system 14B00 may be performed in any order unless as may be specified in the claims. The shown embodiment implements a portion of a computer system, presented as system 14B00, comprising one or more computer processors to execute a set of program code instructions (module 14B10) and modules for accessing memory to hold program code instructions to perform: observing user-to-user interactions and user-to-object interactions (module 14B20); analyzing the user-to-user interactions and the user-to-object interactions to construct a network model of collaboration interactions (module 14B30); calculating a plurality of collaboration parameters based on an analysis of the network model (module 14B40); and presenting, in a user interface, at least some of the plurality of collaboration parameters (module 14B50).

System Architecture Overview

Additional System Architecture Examples

Figure 15A:
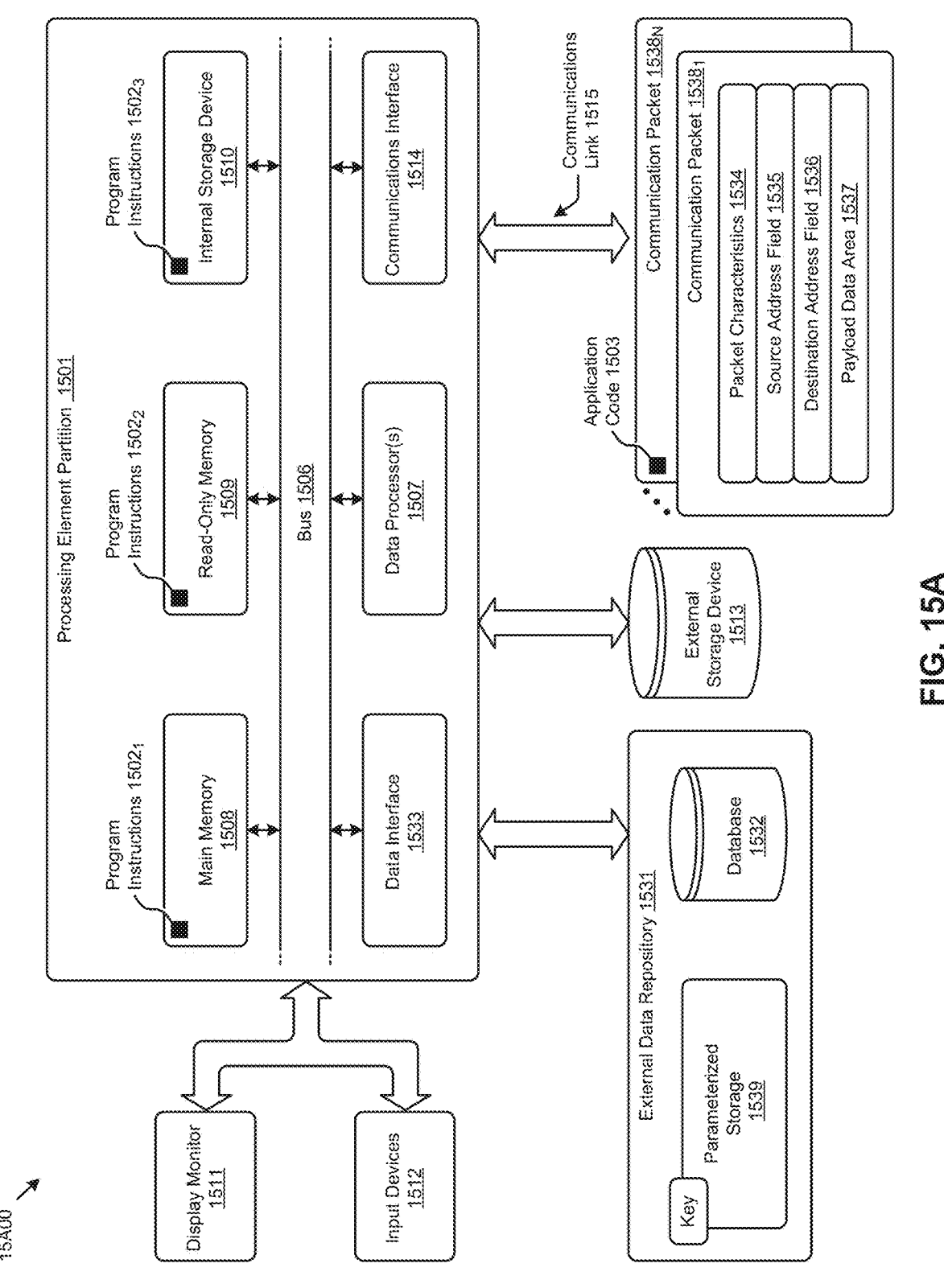
FIG. 15A and FIG. 15B present block diagrams of computer system architectures having components suitable for implementing embodiments of the present disclosure, and/or for use in the herein-described environments.

FIG. 15A depicts a block diagram of an instance of a computer system 15A00 suitable for implementing embodiments of the present disclosure. Computer system 15A00 includes a bus 1506 or other communication mechanism for communicating information. The bus interconnects subsystems and devices such as a central processing unit (CPU), or a multi-core CPU (e.g., data processor 1507), a system memory (e.g., main memory 1508, or an area of random access memory (RAM)), a non-volatile storage device or non-volatile storage area (e.g., read-only memory 1509), an internal storage device 1510 or external storage device 1513 (e.g., magnetic or optical), a data interface 1533, a communications interface 1514 (e.g., PHY, MAC, Ethernet interface, modem, etc.). The aforementioned components are shown within processing element partition 1501, however other partitions are possible. Computer system 15A00 further comprises a display 1511 (e.g., CRT or LCD), various input devices 1512 (e.g., keyboard, cursor control), and an external data repository 1531.

According to an embodiment of the disclosure, computer system 15A00 performs specific operations by data processor 1507 executing one or more sequences of one or more program code instructions contained in a memory. Such instructions (e.g., program instructions $1502_1$, program instructions $1502_2$, program instructions $1502_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 15A00 performs specific networking operations using one or more instances of communications interface 1514. Instances of communications interface 1514 may comprise one or more networking ports that are configurable (e.g., pertaining to speed, protocol, physical layer characteristics, media access characteristics, etc.) and any particular instance of communications interface 1514 or port thereto can be configured differently from any other particular instance. Portions of a communication protocol can be carried out in whole or in part by any instance of communications interface 1514, and data (e.g., packets, data structures, bit fields, etc.) can be positioned in storage locations within communications interface 1514, or within system memory, and such data can be accessed (e.g., using random access addressing, or using direct memory access DMA, etc.) by devices such as data processor 1507.

Communications link 1515 can be configured to transmit (e.g., send, receive, signal, etc.) any types of communications packets (e.g., communication packet 1538₁, communication packet 1538_N) comprising any organization of data items. The data items can comprise a payload data area 1537, a destination address 1536 (e.g., a destination IP address), a source address 1535 (e.g., a source IP address), and can include various encodings or formatting of bit fields to populate packet characteristics 1534. In some cases, the packet characteristics include a version identifier, a packet or payload length, a traffic class, a flow label, etc. In some cases, payload data area 1537 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1507 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1531, which in turn can be formatted into any one or more storage areas, and which can comprise parameterized storage 1539 accessible by a key (e.g., filename, table name, block address, offset address, etc.).

Execution of the sequences of instructions to practice certain embodiments of the disclosure are performed by a single instance of a computer system 15A00. According to certain embodiments of the disclosure, two or more instances of computer system 15A00 coupled by a communications link 1515 (e.g., LAN, public switched telephone network, or wireless network) may perform the sequence of instructions required to practice embodiments of the disclosure using two or more instances of components of computer system 15A00.

Computer system 15A00 may transmit and receive messages such as data and/or instructions organized into a data structure (e.g., communications packets). The data structure can include program instructions (e.g., application code 1503), communicated through communications link 1515 and communications interface 1514. Received program code may be executed by data processor 1507 as it is received and/or stored in the shown storage device or in or upon any other non-volatile storage for later execution. Computer system 15A00 may communicate through a data interface 1533 to a database 1532 on an external data repository 1531. Data items in a database can be accessed using a primary key (e.g., a relational database primary key).

Processing element partition 1501 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1507. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to systems and methods for measuring and reporting collaboration parameters. A module may include one or more state machines and/or combinational logic used to implement or facilitate the operational and/or performance characteristics pertaining to systems and methods for measuring and reporting collaboration parameters.

Various implementations of database 1532 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of systems and methods for measuring and reporting collaboration parameters). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to systems and methods for measuring and reporting collaboration parameters, and/or for improving the way data is manipulated when performing computerized operations pertaining to collecting a corpus of collaboration events and transforming them into numeric parameter values.

Figure 15B:
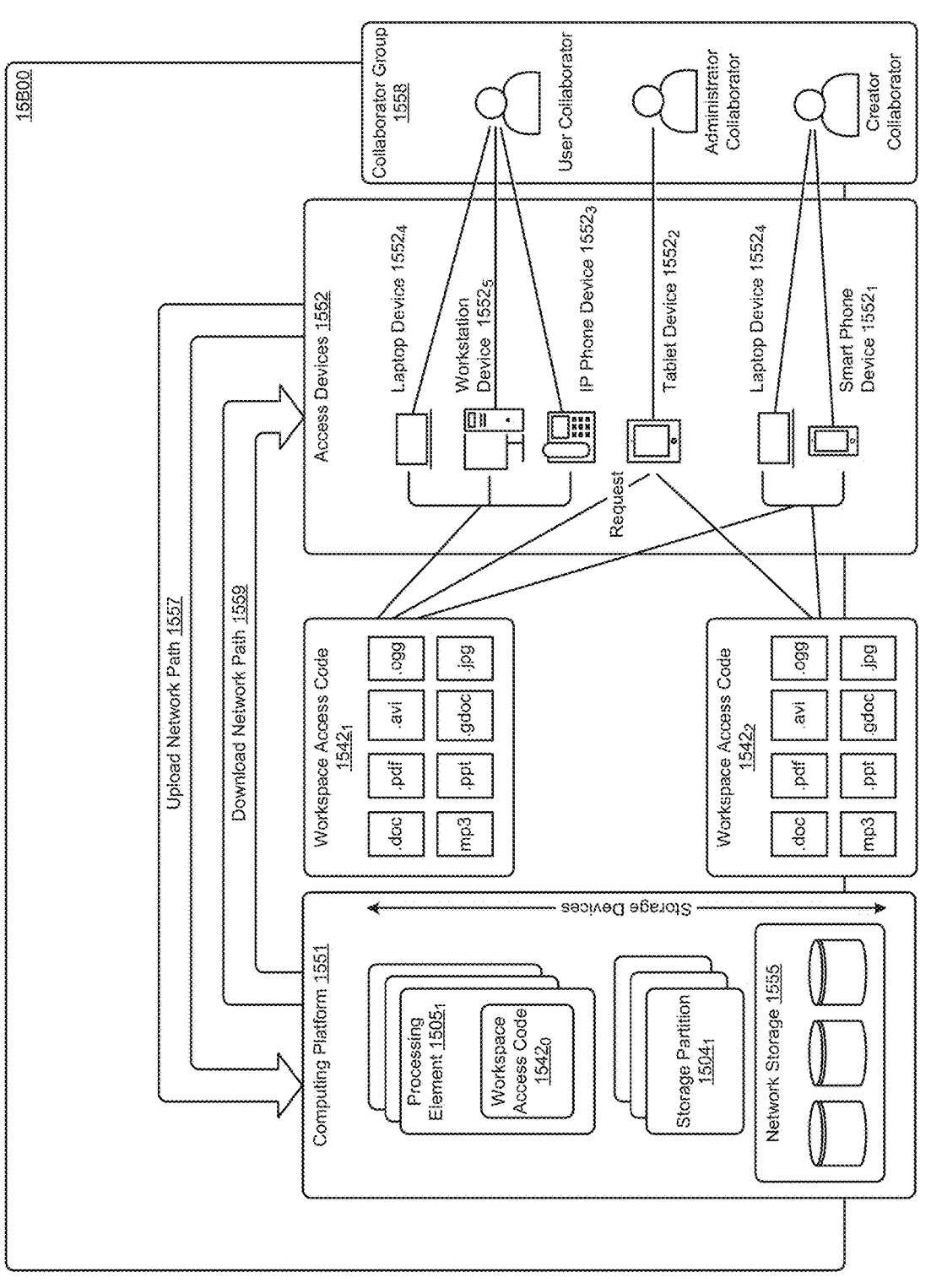

FIG. 15B depicts a block diagram of an instance of a cloud-based environment 15B00. Such a cloud-based environment supports access to workspaces through the execution of workspace access code (e.g., workspace access code 1542₀, workspace access code 1542₁, and workspace access code 1542₂). Workspace access code can be executed on any of access devices 1552 (e.g., laptop device 1552₄, workstation device 1552₅, IP phone device 1552₃, tablet device 1552₂, smart phone device 1552₁, etc.), and can be configured to access any type of object. Strictly as examples, such objects can be folders or directories or can be files of any filetype. A group of users can form a collaborator group 1558, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 1551, including in a middleware setting. As shown, a portion of the workspace access code resides in and can be executed on one or more processing elements (e.g., processing element 1505₁). The workspace access code can interface with storage devices such as networked storage 1555. Storage of workspaces and/or any constituent files or objects, and/or any other code or scripts or data can be stored in any one or more storage partitions (e.g., storage partition 1504₁). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 1557). A stored workspace can be delivered to a particular user and/or shared with other particular users via a download (e.g., a download from a processing element to an access device over a download network path 1559).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for reducing computer resource demands in a collaboration system having shared content objects, the method comprising:

maintaining and providing access to one or more shared content objects hosted by a collaboration system for individual users to perform user-to-object interactions within the collaboration system on the one or more shared content objects, wherein the individual users comprise a first set of users and a remaining set of users, and maintaining and providing the access to the one or more shared content objects comprises:

receiving, at a network interface of the collaboration system, a data stream representing at least the user-to-object interactions in which the individual users that collaborate on the one or more shared content objects over a time period;

tracking and writing, from within the data stream, a first set of values that characterizes user-to-object interactions of the individual users of the collaboration system into first respective memory locations for a first data structure;

reducing, by the collaboration system remote from access devices of the individual users, a list of recipient address data entries respectively corresponding to the individual users into a list of reduced recipient address data entries respectively corresponding to the first set of users based at least in part upon the first set of values stored at the first respective memory locations for the first data structure, wherein the list of reduced recipient address data entries has a first smaller size than the list of recipient address data entries; and tracking and writing, from within the data stream, a second set of values that characterizes a set of sharing events over the one or more shared content objects into second respective memory locations for a second data structure, wherein the one or more shared content objects are shared between a given user and one or more other users of the individual users; and sending, by executing a sequence of instructions at the collaboration system, a plurality of packets for an electronic communication to a targeted subset of users determined from the first set of users while avoiding broadcast of the electronic communication from the collaboration system to all of the first set of users at least by:

accessing the second respective memory locations in the memory to respectively obtain and rank the second set of values stored at the second respective memory locations in the memory based at least in part upon a first criterion, wherein the second set of values is used to determine the first set of users from the individual users;

writing a correlation relation into the memory, the correlation relation correlating the first set of values of the first data structure at the first respective memory locations with the second set of values at the second respective memory locations for the second data structure;

ranking the first set of users based at least in part upon the correlation relation;

reducing, by the collaboration system remote from the access devices of the first set of users based at least upon ranked information pertaining to the first set of users in the memory, the list of reduced recipient address data entries into a list of targeted recipient address data entries for the target subset of users at least by selecting one or more users from the first set as the targeted subset of users based at least in part upon a result of ranking the first set of users and a threshold, wherein the list of targeted recipient address data entries has a second smaller size than the first smaller size of the list of first reduced recipient address data entries; and respectively sending, from the network interface, the electronic communication to the list of targeted recipient address data entries for the targeted subset at least by:

composing one or more software features provided by the collaboration system into the electronic communication; and transmitting the plurality of packets for the electronic communication via the network interface to the list of targeted recipient address data entries for corresponding access devices of the targeted subset of users within the first set of the individual users while avoiding the broadcast of the electronic communication to the list of recipient address data entries for the individual users or the reduced list of recipient address data entries for the first set of users.

2. The method of claim 1, further comprising:

codifying specific content and a characteristic pertaining to the user-to-object interactions and the set of sharing events into the electronic communication prior to sending the electronic communication to the targeted subset of users, wherein the electronic communication comprises a recommendation of an action that pertains to at least one of the one or more software features and is directed to at least one of the targeted subset of users.

3. The method of claim 1, further comprising predicting a usage pattern of the one or more software features, wherein sending the electronic communication to the targeted subset of users comprises narrowcasting the electronic communication only to the targeted subset of users that is determined from the first set of users of the individual users, and a total number of users of the individual users is greater than a total number of users of the targeted subset of users.

4. The method of claim 3, wherein the usage pattern corresponds to at least one of a predicted increase in collaboration system usage, or a predicted decrease in collaboration system usage, and the targeted subset of users pertains to at least one of the one or more software features that comprise a disused feature provided by the collaboration system and is not used by at least one of the first set or the targeted subset of users of the individual users.

5. The method of claim 1, maintaining and providing the access to the one or more shared content objects further comprising:

extracting first data for the at least one first interaction of a first interaction type or second data for the at least one second interaction of a second interaction type from the data stream, wherein the first interaction type corresponds to the user-to-object interactions, and the second interaction type corresponds to user-to-user interactions;

transforming the first data in the data stream into a first element in a first table or list structure in the memory or second data in the data stream into a second element in a second table or list structure in the memory;

transforming the first element or the second element into a vector for storage in the first data structure in the memory, using one or more interaction parameters that are determined at least by traversing a network model that is constructed from the data stream; and tracking collaboration contributions based at least in part upon data in the second data structure, wherein the second data structure is constructed from a plurality of collaboration parameters comprising at least one of a company index, or a time, or a first time period and a second time period, and the data in the second data structure pertains to one or more interactions raised by at least one of the individual users upon the one or more shared content objects.

6. The method of claim 5, wherein a derivative of the second data structure corresponding to a first time period is persisted before creating another second data structure corresponding to a second time period.

7. The method of claim 5, wherein the plurality of collaboration parameters comprises at least one of an individual productivity, a file sharing quantity, a productivity measure for a user of the individual users, or a productivity measure for a collaborator group.

8. The method of claim 1, further comprising tracking individual contributions of the individual users based at least in part upon a total number of interactions and a total number of types of the interactions raised by the individual users; and storing a result of tracking the individual contributions in the first data structure, wherein at least one of user-to-user interactions or user-to-object interactions comprises at least one of a file open transaction, or a file preview transaction, or a download transaction.

9. A non-transitory computer readable medium having stored thereon a sequence of instructions which, when stored in memory and executed by one or more processors causes the one or more processors to perform a set of acts for reducing computer resource demands in a collaboration system having shared content objects, the set of acts comprising:

maintaining and providing access to one or more shared content objects hosted by a collaboration system for individual users to perform user-to-object interactions within the collaboration system on the one or more shared content objects, wherein the individual users comprise a first set of users and a remaining set of users, and maintaining and providing the access to the one or more shared content objects comprises:

receiving, at a network interface of the collaboration system, a data stream representing at least the user-to-object interactions in which the individual users that collaborate on the one or more shared content objects over a time period;

tracking and writing, from within the data stream, a first set of values that characterizes user-to-object interactions of the individual users of the collaboration system into first respective memory locations for a first data structure;

reducing, by the collaboration system remote from access devices of the individual users, a list of recipient address data entries respectively corresponding to the individual users into a list of reduced recipient address data entries respectively corresponding to the first set of users based at least in part upon the first set of values stored at the first respective memory locations for the first data structure, wherein the list of reduced recipient address data entries has a first smaller size than the list of recipient address data entries; and tracking and writing, from within the data stream, a second set of values that characterizes a set of sharing events over content objects into second respective memory locations for a second data structure, wherein the one or more shared content objects are shared between a given user and other users of the individual users of the collaboration system; and sending, by executing a sequence of instructions at the collaboration system, a plurality of packets for an electronic communication to a targeted subset of users determined from the first set of users while avoiding broadcast of the electronic communication from the collaboration system to all of the first set of users at least by:

accessing the second respective memory locations in the memory to respective obtain and rank the second set of values stored at the second respective memory locations in the memory based at least in part upon a first criterion, wherein the second set of values is used to determine the first set of users from the individual users;

writing a correlation relation in the memory, the correlation relation correlating the first set of values of the first data structure at the first respective memory locations with the second set of values at the second respective memory locations for the second data structure;

ranking the first set of users based at least in part upon the correlation relation;

reducing, by the collaboration system remote from the access devices of the first set of users based at least upon ranked information pertaining to the first set of users in the memory, the list of reduced recipient address data entries into a list of targeted recipient address data entries for the target subset of users at least by selecting one or more users from the first set as the targeted subset of users based at least in part upon a result of ranking the first set of users and a threshold, wherein the list of targeted recipient address data entries has a second smaller size than the first smaller size of the list of first reduced recipient address data entries; and respectively sending, from the network interface, the plurality of packets for the electronic communication to the list of targeted recipient address data entries for the targeted subset at least by:

composing one or more software features provided by the collaboration system into the electronic communication; and transmitting the electronic communication via the network interface to the list of targeted recipient address data entries for corresponding access devices of the targeted subset of users within the first subset of the individual users while avoiding the broadcast of the electronic communication to the list of recipient address data entries for the individual users or the reduced list of recipient address data entries for the first set of users.

10. The non-transitory computer readable medium of claim 9, the set of acts further comprising:

codifying specific content and a characteristic pertaining to the user-to-object interactions and the set of sharing events into the electronic communication prior to sending the electronic communication to the targeted subset of users, wherein the electronic communication comprises a recommendation of an action that pertains to at least one of the one or more software features and is directed to at least one of the targeted subset of users.

11. The non-transitory computer readable medium of claim 9, further comprising instructions which, when stored in memory and executed by the one or more processors causes the one or more processors to perform acts of predicting a usage pattern of the one or more software features, wherein sending the electronic communication to the targeted subset of users comprises narrowcasting the electronic communication only to the targeted subset of users that is determined from the first set of users of the individual users, and a total number of users of the individual users is greater than a total number of users of the targeted subset of users.

12. The non-transitory computer readable medium of claim 11, wherein the usage pattern corresponds to at least one of a predicted increase in collaboration system usage, or a predicted decrease in collaboration system usage, and the targeted subset of users pertains to at least one of the one or more software features that comprise a disused feature provided by the collaboration system and is not used by at least one of the first or the targeted subset of users of the individual users.

13. The non-transitory computer readable medium of claim 9, the set of acts further comprising:

extracting first data for the at least one first interaction of a first interaction type or second data for the at least one second interaction of a second interaction type from the data stream, wherein the first interaction type corresponds to the user-to-object interactions, and the second interaction type corresponds to user-to-user interactions;

transforming the first data in the data stream into a first element in a first table or list structure in the memory or second data in the data stream into a second element in a second table or list structure in the memory;

transforming the first element or the second element into a vector for storage in the first data structure in the memory, using one or more interaction parameters that are determined at least by traversing a network model that is constructed from the data stream; and tracking collaboration contributions based at least in part upon data in the second data structure, wherein the second data structure is constructed from a plurality of collaboration parameters comprising at least one of a company index, or a time, or a first time period and a second time period, and the data in the second data structure pertains to one or more interactions raised by at least one of the individual users upon the one or more shared content objects.

14. The non-transitory computer readable medium of claim 13, wherein a derivative of the second data structure corresponding to a first time period is persisted before creating another second data structure corresponding to a second time period.

15. The non-transitory computer readable medium of claim 13, wherein the plurality of collaboration parameters comprises at least some of an individual productivity, a file sharing quantity, a productivity measure for an employee, or a productivity measure for a collaborator group.

16. The non-transitory computer readable medium of claim 9, the set of acts further comprising tracking individual contributions of the individual users based at least in part upon a total number of interactions and a total number of types of the interactions raised by the individual users; and storing a result of tracking the individual contributions in the first data structure, wherein at least one of user-to-user interactions or user-to-object interactions comprises at least one of a file open transaction, or a file preview transaction, or a download transaction.

17. A system for reducing computer resource demands in a collaboration system having shared content objects, the system comprising:

a non-transitory storage medium having stored thereon a sequence of instructions; and one or more processors that execute the sequence of instructions, execution of the sequence of instructions causes the one or more processors to perform a set of acts, the set of acts comprising:

maintaining and providing access to one or more shared content objects hosted by a collaboration system for individual users to perform user-to-object interactions within the collaboration system on the one or more shared content objects, wherein the individual users comprise a first set of users and a remaining set of users, and maintaining and providing the access to the one or more shared content objects comprises:

receiving, at network interface of the collaboration system, a data stream representing at least the user-to-object interactions in which the individual users that collaborate on the one or more shared content objects over a time period;

tracking and writing, from within the data stream, a first set of values that characterizes user-to-object interactions of individual users of the collaboration system into first respective memory locations for a first data structure;

reducing, by the collaboration system remote from access devices of the individual users, a list of recipient address data entries respectively corresponding to the individual users into a list of reduced recipient address data entries respectively corresponding to the first set of users based at least in part upon the first set of values stored at the first respective memory locations for the first data structure, wherein the list of reduced recipient address data entries has a first smaller size than the list of recipient address data entries; and tracking and writing, from within the data stream, a second set of values that characterizes a set of sharing events over the shared content objects into second respective memory locations for a second data structure, wherein the one or more shared content objects are shared between a given user and other users of the individual users of the collaboration system; and sending, by executing a sequence of instructions at the collaboration system, a plurality of packets for an electronic communication to a targeted subset of users determined from the first set of users while avoiding broadcast of the electronic communication from the collaboration system to all of the first set of users at least by:

accessing the second respective memory locations in the memory to respectively obtain and rank the second set of values stored at the second respective memory locations in the memory based at least in part upon a first criterion, wherein the second set of values is used to determine the first set of users from the individual users;

writing a correlation relation into the memory, the correlation relation correlating the first set of values of the first data structure at the first respective memory locations with the second set of values at the second respective memory locations for the second data structure;

ranking the first set of users based at least in part upon the correlation relation;

reducing, by the collaboration system remote from the access devices of the first set of users based at least upon ranked information pertaining to the first set of users in the memory, the list of reduced recipient address data entries into a list of targeted recipient address data entries for the target subset of users at least by selecting one or more users from the first set as the targeted subset of users based at least in part upon a result of ranking the first set of users and a threshold, wherein the list of targeted recipient address data entries has a second smaller size than the first smaller size of the list of first reduced recipient address data entries; and respectively sending, from the network interface, the plurality of packets for the electronic communication to the list of targeted recipient address data entries for the targeted subset at least by:

composing one or more software features provided by the collaboration system into the electronic communication; and transmitting the electronic communication via the network interface to the list of targeted recipient address data entries for corresponding access devices of the targeted subset of users within the first subset of the individual users while avoiding the broadcast of the electronic communication to the list of recipient address data entries for the individual users or the reduced list of recipient address data entries for the first set of users.

18. The system of claim 17, the set of acts further comprising: codifying specific content and a characteristic pertaining to the user-to-object interactions and the set of sharing events into the electronic communication prior to sending the electronic communication to the targeted subset of users, wherein the electronic communication comprises a recommendation of an action that pertains to at least one of the one or more software features and is directed to at least one of the targeted subset of users.

19. The system of claim 17, further comprising instructions which, when stored in memory and executed by the one or more processors causes the one or more processors to perform acts of predicting a usage pattern of the one or more software features, wherein sending the electronic communication to the targeted subset of users comprises narrowcasting the electronic communication only to the targeted subset of users that is determined from the first set of users of the individual users, and a total number of users of the individual users is greater than a total number of users of the targeted subset of users.

20. The system of claim 19, wherein the usage pattern corresponds to at least one of a predicted increase in collaboration system usage, or a predicted decrease in collaboration system usage, and the targeted subset of users pertains to at least one of the one or more software features that comprise a disused feature provided by the collaboration system and is not used by at least one of the first or the targeted subset of users of the individual users.

* * * * *